US005960098A

United States Patent [19]

Tao

[11] Patent Number: 5,960,098

[45] Date of Patent: *Sep. 28, 1999

[54] DEFECTIVE OBJECT INSPECTION AND REMOVAL SYSTEMS AND METHODS FOR IDENTIFYING AND REMOVING DEFECTIVE OBJECTS

[75] Inventor: Yang Tao, Woodstock, Va.

[73] Assignee: Agri-Tech, Inc., Woodstock, Va.

[ * ] Notice: This patent is subject to a terminal disclaimer.

[21] Appl. No.: 08/970,420

[22] Filed: Nov. 14, 1997

Related U.S. Application Data

[62] Division of application No. 08/483,962, Jun. 7, 1995, Pat. No. 5,732,147.

[51] Int. Cl.[6] ...................................................... G06K 9/00

[52] U.S. Cl. ............................ 382/110; 382/274; 348/89

[58] Field of Search .................................. 382/110, 154, 382/173, 203, 256, 257, 274, 276; 348/89, 91; 209/577, 576; 250/559.45, 559.46; 356/237.1, 376; 345/426, 427

[56] References Cited

U.S. PATENT DOCUMENTS

| | | | |
|---|---|---|---|
| Re. 29,031 | 11/1976 | Irving et al. | 209/111.6 |
| 3,867,041 | 2/1975 | Brown et al. | 356/209 |
| 3,930,994 | 1/1976 | Conway et al. | 209/74 M |
| 4,025,422 | 5/1977 | Malvick et al. | 209/111.5 |
| 4,105,123 | 8/1978 | Irving et al. | 209/111.6 |
| 4,106,628 | 8/1978 | Warkentin et al. | 209/74 M |
| 4,146,135 | 3/1979 | Sarker et al. | 209/580 |
| 4,246,098 | 1/1981 | Conway et al. | 209/558 |

(List continued on next page.)

FOREIGN PATENT DOCUMENTS

| | | | |
|---|---|---|---|
| 0 058 028 | 8/1982 | European Pat. Off. | B07C 5/342 |
| 0 122 543 | 10/1984 | European Pat. Off. | H04N 7/18 |
| 0 566 397 | 10/1993 | European Pat. Off. | B07C 5/342 |
| 0 620 651 | 10/1994 | European Pat. Off. | B07C 5/342 |
| 61-221887 | 10/1986 | Japan | 382/154 |
| 63-43391 | 2/1988 | Japan | H05K 1/16 |
| 1-217255 | 8/1989 | Japan | G01N 29/00 |
| 3-75990 | 3/1991 | Japan | G07F 9/10 |
| 3-289227 | 12/1991 | Japan | H04B 7/26 |
| 4-210044 | 7/1992 | Japan | A61B 5/0225 |
| 4-260180 | 9/1992 | Japan | G06F 15/62 |
| 5-70099 | 3/1993 | Japan | B66F 19/00 |
| 5-70100 | 3/1993 | Japan | B66F 19/00 |
| 5-96246 | 4/1993 | Japan | B07C 5/10 |
| 6-55144 | 3/1994 | Japan | B07C 5/34 |
| 6-200873 | 7/1994 | Japan | F04B 27/08 |
| 6-257361 | 9/1994 | Japan | E06C 7/16 |
| 6-257362 | 9/1994 | Japan | E21B 6/00 |

OTHER PUBLICATIONS

Thomas L. Stiefvater, "Investigation of an Optical Apple Bruise Detection Technique," M.S. Thesis, Cornell University, Agricultural Engineering Department, 1970.

*Primary Examiner*—Andrew W. Johns
*Attorney, Agent, or Firm*—Finnegan, Henderson, Farabow, Garrett & Dunner, L.L.P.

[57] ABSTRACT

Image processing system using cameras and image processing techniques to identify undesirable objects on roller conveyor lines. The cameras above the conveyor capture images of the passing objects. The roller background information is removed and images of the objects remain. To analyze each individual object accurately, the adjacent objects are isolated and small noisy residue fragments are removed. A spherical optical transform and a defect preservation transform preserve any defect levels on objects even below the roller background and compensate for the non-lambertian gradient reflectance on spherical objects at their curvatures and dimensions. Defect segments are then extracted from the resulting transformed images. The size, level, and pattern of the defect segments indicate the degree of defects in the object. The extracted features are fed into a recognition process and a decision making system for grade rejection decisions. The locations in coordinates of the defects generated by a defect allocation function are combined with defect rejection decisions and user parameters to signal appropriate mechanical actions such as to separate objects with defects from those that are defect-free.

15 Claims, 21 Drawing Sheets

U.S. PATENT DOCUMENTS

| | | | |
|---|---|---|---|
| 4,281,933 | 8/1981 | Houston et al. | 356/425 |
| 4,324,335 | 4/1982 | Conway et al. | 209/586 |
| 4,330,062 | 5/1982 | Conway et al. | 209/582 |
| 4,403,669 | 9/1983 | Raz | 177/145 |
| 4,476,982 | 10/1984 | Paddock et al. | 209/582 |
| 4,479,852 | 10/1984 | Ducloux | 209/552 |
| 4,515,275 | 5/1985 | Mills et al. | 209/558 |
| 4,534,470 | 8/1985 | Mills | 209/585 |
| 4,585,126 | 4/1986 | Paddock et al. | 209/539 |
| 4,645,080 | 2/1987 | Scopatz | 209/558 |
| 4,687,107 | 8/1987 | Brown et al. | 209/556 |
| 4,693,607 | 9/1987 | Conway | 356/380 |
| 4,735,323 | 4/1988 | Okada et al. | 209/582 |
| 4,741,042 | 4/1988 | Throop et al. | 382/1 |
| 4,825,068 | 4/1989 | Suzuki et al. | 250/223 R |
| 4,878,582 | 11/1989 | Codding | 209/580 |
| 4,884,696 | 12/1989 | Peleg | 209/545 |
| 4,940,536 | 7/1990 | Cowlin et al. | 209/592 |
| 5,012,524 | 4/1991 | LeBeau | 382/8 |
| 5,018,864 | 5/1991 | Richert | 356/372 |
| 5,024,047 | 6/1991 | Leverett | 53/502 |
| 5,026,982 | 6/1991 | Stroman | 250/223 R |
| 5,056,124 | 10/1991 | Kakimoto et al. | 378/57 |
| 5,060,290 | 10/1991 | Kelly et al. | 382/18 |
| 5,077,477 | 12/1991 | Stroman et al. | 250/349 |
| 5,085,325 | 2/1992 | Jones et al. | 209/580 |
| 5,101,982 | 4/1992 | Gentili | 209/556 |
| 5,103,304 | 4/1992 | Turcheck, Jr. et al. | 358/101 |
| 5,106,195 | 4/1992 | Richert | 356/407 |
| 5,117,611 | 6/1992 | Heck et al. | 53/475 |
| 5,156,278 | 10/1992 | Aaron et al. | 209/556 |
| 5,164,795 | 11/1992 | Conway | 356/407 |
| 5,223,917 | 6/1993 | Richert | 356/407 |
| 5,237,407 | 8/1993 | Crezee et al. | 358/107 |
| 5,244,100 | 9/1993 | Regier et al. | 209/556 |
| 5,280,838 | 1/1994 | Blanc | 209/552 |
| 5,286,980 | 2/1994 | Richert | 250/560 |
| 5,305,894 | 4/1994 | McGarvey | 209/580 |
| 5,315,879 | 5/1994 | Crochon et al. | 73/818 |
| 5,318,173 | 6/1994 | Datari | 209/580 |
| 5,339,963 | 8/1994 | Tao | 209/581 |
| 5,379,347 | 1/1995 | Kato et al. | 382/8 |
| 5,621,824 | 4/1997 | Ijiri et al. | 382/274 |
| 5,732,147 | 3/1998 | Tao | 382/110 |

DEFECTIVE OBJECT INSPECTION AND REMOVAL SYSTEMS AND METHODS FOR IDENTIFYING AND REMOVING DEFECTIVE OBJECTS

This is a division of application Ser. No. 08/483,962, filed Jun. 7, 1995, now U.S. Pat. No. 5,732,147.

BACKGROUND OF THE INVENTION

1. Field of the Invention

This invention relates to defect inspection systems and, more particularly, to apparatus and methods for high speed processing of images of objects such as fruit. The invention further facilitates the location of defects in the objects and separating those objects with defects from other objects that have only a few or no defects.

2. Description of the Related Art

The United States packs over 170 million boxes of apples each year. Although some aspects of the packing process are now automated, much of it is still left to manual laborers. The automated equipment that is available is generally limited to conveyor systems and systems for measuring the color, size, and weight of apples.

A system manufactured by Agri-Tech Inc. of Woodstock, Va., automates certain aspects of the apple packing process. At a first point in the packing system, apples are floated into cleaning tanks. The apples are elevated out of the tank onto an inspection table. Workers along side the table inspect the apples and eliminate any unwanted defective apples (and other foreign materials). The apples are then fed on conveyors to cleaning, waxing, and drying equipment.

After being dried, the apples are sorted according to color, size, and shape, and then packaged according to the sort. While this sorting/packaging process may be done by workers, automated sorting systems are more desirable. One such system that is particularly effective for this sorting process is described in U.S. Pat. No. 5,339,963.

As described, a key step of the apple packing process is still done by hand: the inspection process. Along the apple conveyers in the early cleaning process, workers are positioned to visually inspect the passing apples and remove the apples with defects, i.e., apples with rot, apples that are injured, diseased, or seriously bruised, and other defective apples, as well as foreign materials. These undesirable objects, especially rotted and diseased apples, must be removed in the early stage (before coating) to prevent contamination of good fruit and to reduce cost in successive processing.

Working in a wet, humid, and dirty environment and inspecting large amounts of apples each day is a difficult and labor intensive job. With tons of apples passing in front of the eyes of workers, human fatigue is unavoidable; there are always misinspected apples passing through the lines.

Apples are graded in part according to the amount and extent of defects. In Washington State, for example, apples with defects are used for processing (e.g., to make into apple sauce or juice). These apples usually cost less than apples with no defects or only: a few defects. Apples that are not used for processing, i.e., fresh market apples, are also graded not only on the size of any defects, but also on the number of defects. Thus, it would be desirable to provide a system which integrates an apple inspection system that checks for defects in apples into the rest of the packing process.

A defect inspection and removal system would significantly innovate the fresh fruit packing process. It will liberate humans from traditional hand manipulation of agricultural products. By placing the defect inspection and removal system at the beginning of the packing line, it will eliminate bad fruit, contaminants, and foreign materials from getting into the rest of the packing process. This will reduce the costs of materials, energy, labor, and operations.

An automated defect inspection and removal system can work continuously for long hours and will never tire or suffer from fatigue. The system will not only improve the quality of fresh apples and the productivity of packing, but also improve the health of workers by freeing them from the wet and oppressive environment.

Twenty-five years ago a researcher identified three conditions for a suitable method of detecting bruises in apples. The method must be: (1) based on reliably identifiable bruise effects, (2) nondestructive, and (3) adaptable to high-speed sorting. T. L. Stiefvater, M. S. Thesis, Cornell University Agricultural Engineering Department, 1970.

In U.S. Pat. No. 3,867,041, Brown et al. proposed a nondestructive method for detecting bruises in fruit. That method relied solely on a comparison of the light reflected from a bruised portion of the fruit with the light reflected from an unbruised portion. A bruise was detected when the light reflected from the bruised portion was significantly lower than the amount of light reflected from the unbruised portion. However, Brown et al. failed to consider the spherical nature of fruit. Like the light reflectance at a portion of fruit with a bruise, the light reflectance at the outer perimeter of the fruit is also low. This is due to the substantially spherical nature of fruit. Thus, to effectively detect bruises in fruit, a method must consider the spherical nature of the object being processed. Brown et al. also failed to address the issue of having to distinguish bruises with low reflectance from background that also has low reflectance. Brown et al. offered no solution to either of these problems.

Conway et al. proposed a solution for considering the spherical nature of fruit in U.S. Pat. No. 4,246,098. That solution simply treated segments near fruit edges in the same manner as the background area—i.e., ignoring them. This can be a significant problem when a blemish is located in the ignored segments.

Another proposed system for detecting bruises in apples is described in U.S. Pat. No. 4,741,042. However, that system makes the erroneous fundamental assumption that all bruises, which are defined as surface blemishes, are circular in shape. (The bruise is determined by whether or not a segment is round.) Examination of a single truck load of apples shows that a great percentage of apples with defects have bruises that are not circular or otherwise uniform in shape. Further, the complete range of defects includes not only the minor circular surface bruises of the type described in U.S. Pat. No. 4,741,042 but also includes rots, injuries, diseases, and serious bruises, which may not be apparent from a simple viewing of the apple surface.

SUMMARY OF THE INVENTION

Accordingly, the present invention is directed to apparatus and methods using cameras and image processing techniques to identify undesirable objects (e.g., defective apples) among large numbers of objects moving on roller conveyor lines. Each one of a plurality of cameras observes many objects, instead of a single object, in its views, and locates and identifies the undesirable objects. Objects with no defects or only a few defects are permitted to pass through the system as good objects, whereas the remaining objects are classified and separated as defective objects. There may be more than one category of defective objects.

The cameras above the conveyor capture images of the conveyed objects. The images are converted into digital form and stored in a buffer memory for instantaneous digital image processing. The conveyor background information is first removed and images of the objects remain. To analyze each individual object accurately, the adjacent objects are isolated and small noisy residue fragments are removed. The defect preservation transform preserves any defect levels on objects even below the roller background. A spherical transformation algorithm compensates for the non-lambertian gradient reflectance on spherical objects at their curvatures and dimensions. Defect segments are then extracted from the resulting transformed images. For the objects that are defect-free, the object image is free of defect segments. For defective objects, however, defect segments are identified. The size, level, and pattern of the defect segments indicates the degree of defects in the object. The extracted features are fed into a recognition process and a decision making system for grade rejection decisions. The locations in coordinates of the defects generated by a defect allocation algorithm are combined with defect rejection decisions and user parameters to signal appropriate mechanical actions to remove objects with defects from those that are defect-free.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as in the appended drawings.

To achieve the objects of this invention and attain its advantages, broadly speaking, this invention provides for a defective object identification and removal system having a conveyor that transports a plurality of objects through an imaging chamber with at least one camera disposed within the imaging chamber to capture images of the transported objects. The system comprises an image processor for identifying, based on the images, defective objects from among the transported objects and for generating defect selection signals when the defective objects have been identified, and an ejector for ejecting the defective objects in response to the defect selection signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred implementation of the invention and, together with the description, serve to explain the principles of the invention.

In the drawings.

DESCRIPTION OF THE PREFERRED IMPLEMENTATION

Reference will now be made in detail to the preferred implementation of the present invention as illustrated in the accompanying drawings. Wherever possible, the same reference numbers will be used throughout the drawings and the following description to refer to the same or like parts.

System Architecture

Figure 1:
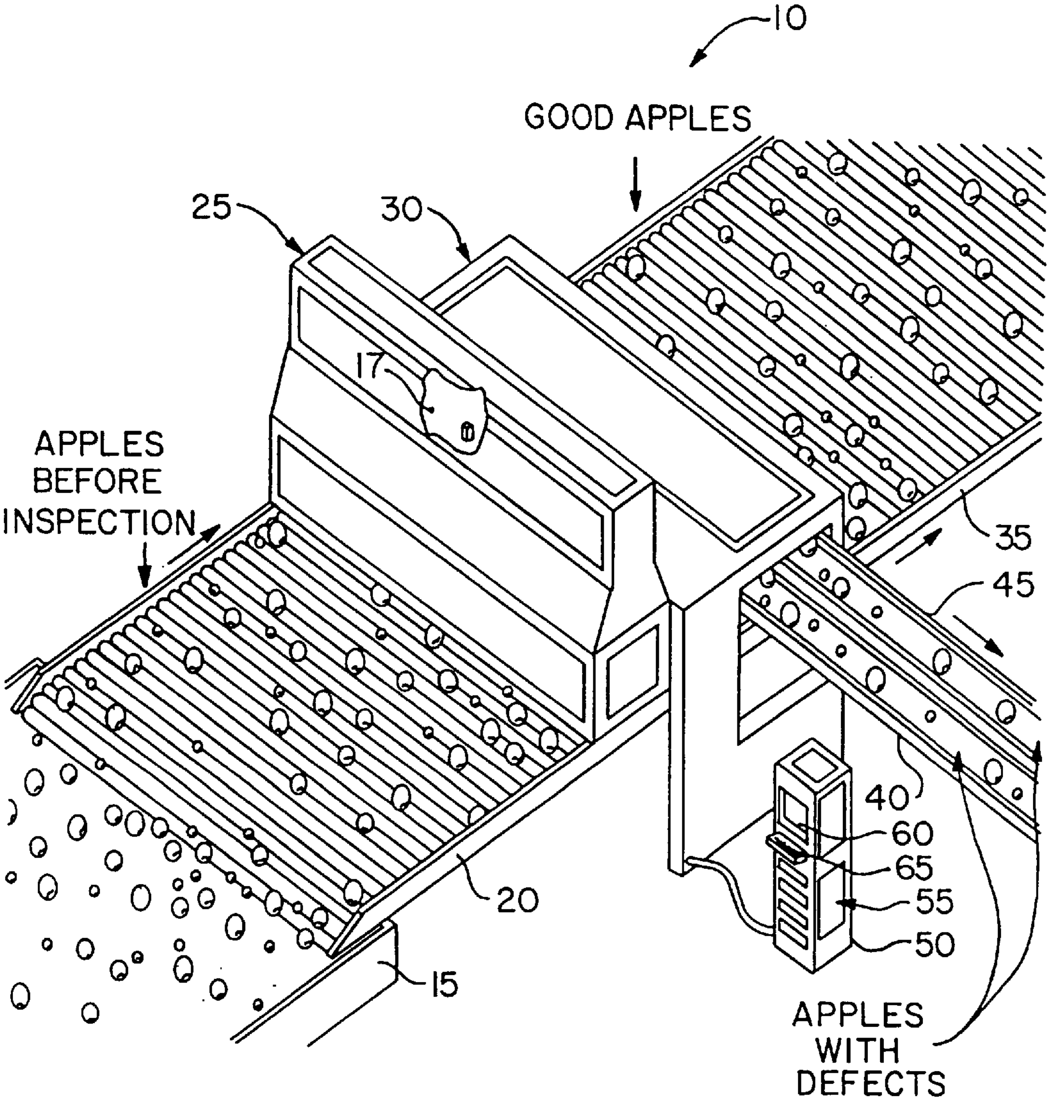
FIG. 1 illustrates the defect removal system according to the; preferred implementation.

FIG. 1 illustrates a defect removal system 10 including the preferred implementation of the present invention. The system 10 processes objects, for example, fruit, and more particularly apples, separating the objects with few or no defects from objects considered to be defective. A threshold for determining how many defects in an object makes that object a defective one may be determined by the user.

As shown in FIG. 1, apples in a tank 15 are fed onto conveyor 20. The apples then pass through imaging chamber 25 during which at least one camera (see cut-away portion 17 of the imaging chamber 25) captures images of the apples as they pass along the conveyor 20.

A rejection chamber 30 is positioned adjacent to the imaging chamber 25. The apples are separated within rejection chamber 30. Apples with only a few or no defects are considered to be good apples (based on threshold criteria determined by the user). Good apples simply continue to pass through the system 10 along output conveyor 35.

Defective apples, however, are diverted onto conveyors 40 and 45. Conveyors 40 and 45 are provided to further separate the apples with defects into multiple categories or classes based, for example, on a defect index ($D_i$) which measures the extent of the defects in the apples. Thus, apples with only a few defects are diverted within rejection chamber 30 to conveyor 40 and apples with more defects are diverted to conveyor 45.

According to apple industry practice, a first grade of defective apples ($D_1$) e.g., those that end up on conveyor 40, may be used to make juice and a second grade of defective apples ($D_2$), e.g., those that end up on conveyor 45, may be used to make sauce.

Conveyors 20, 35, 40 and 45, and equipment within imaging chamber 25 and rejection chamber 30 are all connected to and controlled by computer system 50. The computer system 50 is comprised of high speed image processor 55, display 60, and keyboard 65. In the preferred implementation, image processor 55 is comprised of microprocessors and multiple megabytes of DRAM and VRAM; though other microprocessors and configurations may be used without departing from the scope of the present invention. The microprocessor processes images and other data in accordance with program instructions, all of which may be stored during processing in the DRAM and VRAM.

Display 60 displays outputs generated by high speed image processor 55 during operation. Display 60 also displays user inputs, which are entered via the keyboard 65. User input information such as threshold levels used during the image processing operation of system 10, is employed by the system to determine, for example, grades of apples.

The computer system 50 also includes a mass storage device, for example, a hard disk, for storing program instructions, i.e., software, used to direct image processor 55 to perform the functions of the system 10. These functions are described in detail below.

General System Operation

Figure 2:
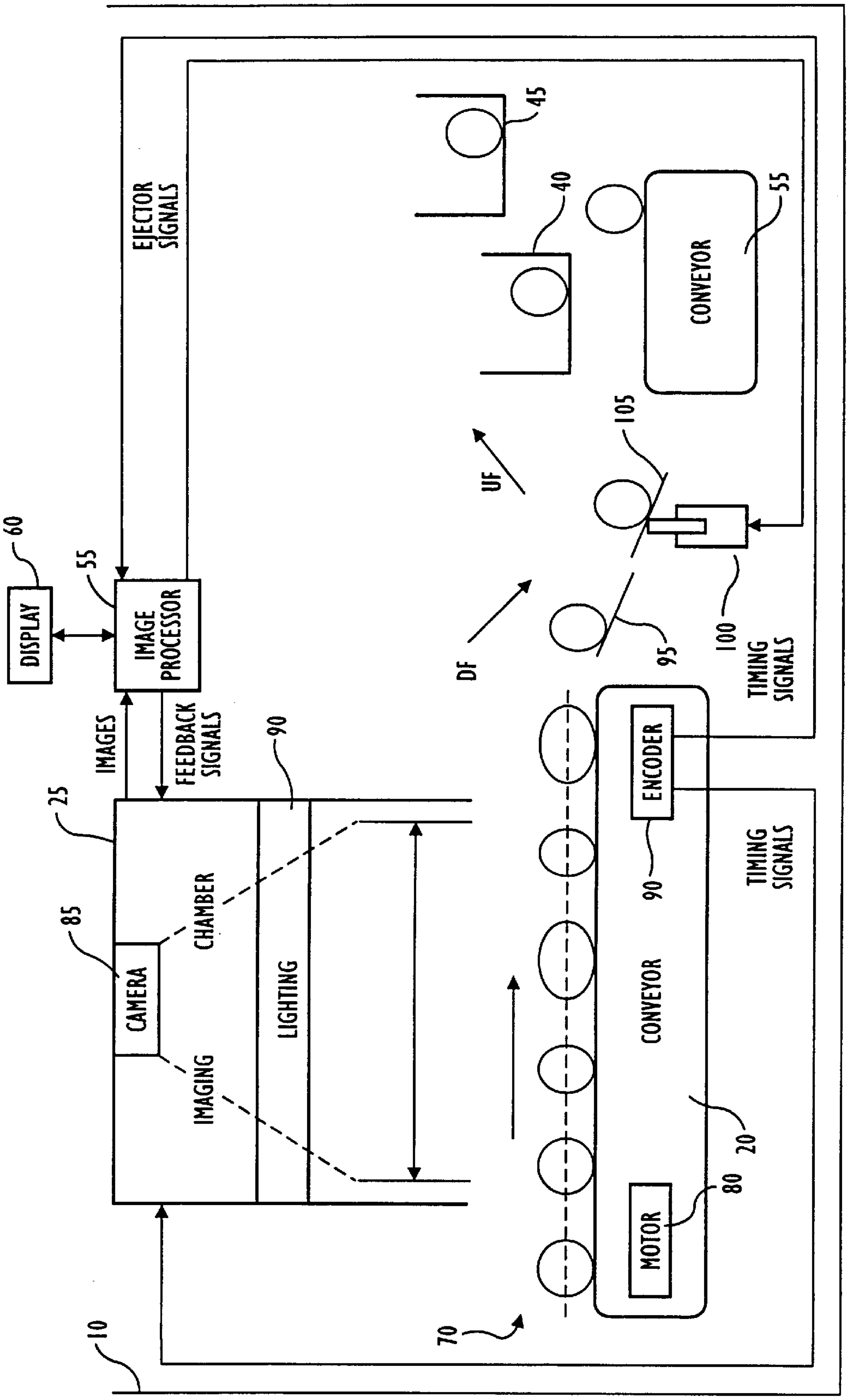
FIG. 2 is a block diagram of a defect removal system employing the preferred implementation.

FIG. 2, illustrates a single lane of objects 70, such as apples, passing along conveyors 20 and 35 through defect removal system 10. Motor 80 drives conveyor 20 in response to drive signals (not shown) from image processor 55. Another motor (not shown) drives conveyor 35 at either the same speed or an increased speed. Since objects 70 driven on conveyor 35 are classified by image processor 55 as good objects (i.e., non-defective objects), the speed of conveyor 35 is not important, only it must be at least as fast as the speed of conveyor 20 to avoid a jam. In case of a jam, image processor 55 may signal motor 80 to slow down or the motor (not shown) for conveyor 35 to speed up, whichever is appropriate under the circumstances.

Disposed between conveyors 20 and 35 are directional table surface 95 and ejector 100, which also has a top grooved portion 105 attached thereto. Directional table surface 95 is appropriately curved to direct objects in a single file over the top grooved portion 105. Both directional surface 95 and the top grooved portion 105 are angled to provide downward force DF when objects pass between conveyors 20 and 35.

As objects 70 pass through imaging chamber 25, camera 85 captures images of the objects. Lighting element 90 within imaging chamber 25 illuminates chamber 25, which enables camera 85 to capture images of objects 70 passing along on conveyor 20. Camera 85 is an infrared camera; that is, a standard industrial use charge coupled device (CCD) camera with an infrared lens. It has been determined that an infrared camera provides best results for most varieties of apples, including red, gold (yellow), and green colored apples. Lighting element 90 generates a uniform distribution of light in imaging chamber 25. It has been determined that fluorescent lights provide not only uniform distribution of light within imaging chamber 25, but also satisfy engineering criteria for (1) long life and (2) low heat.

Encoder 92, which is connected to and is part of conveyor 20, provides timing signals to both camera 85 (within imaging chamber 25) and image processor 55. Timing signals provide information required to coordinate operations of camera 85 with those of image processor 55 and operation of ejector 100. For example, timing signals provide information on the logical and physical positions of objects while traveling on conveyor 20. Timing signals are also used to determine the speed at which motor 80 drives conveyor 20. This speed is reflected in how fast objects 70 pass through imaging chamber 25 where camera 85 captures images of objects 70. The speed also corresponds to how fast image processor 55 processes images of objects 70 and determines which of objects 70 are to pass through onto conveyor 35 or are to be separated onto conveyors 40 and 45. Use of timing signals for synchronizing operations within both imaging chamber 25 and image processor 55 is critical to efficient and accurate operation of system 10.

Image processor 55 performs the image processing operations of system 10. Details on these operations will be discussed below. In general, image processor 55 acquires from camera 85 images of objects passing along conveyor 20 and selects, based on those images, objects that exceed a threshold of acceptability (e.g., have too many defects), which threshold level may be determined based on criteria selected by the user. When image processor 55 identifies an object with characteristics that exceed this predetermined threshold, image processor 55 sends ejector signals at an appropriate time determined based upon timing signals from encoder 92 to ejector 100. Ejector solenoid 100 then applies an appropriate amount of upward and forward force UF on the selected object to divert that object onto either conveyor 40 or conveyor 45. The amount of force UF is determined by image processor 55 and controls the signal sent to ejector 100.

Image processor 55 also provides feedback signals to camera 85 to close the loop. Among the images received by image processor 55 is a reference (or calibration) image. This reference image is used by image processor 55 to determine whether conditions in imaging chamber 25 are within a preset tolerance, and to instruct camera 85 to adjust accordingly.

In the preferred implementation, lighting conditions within chamber 25 may vary due to changes of conditions of conveyor 20 while objects 70, such as apples, are being processed. Apples that are wet may leave water and other residue on conveyor 20. The water as well as humidity resulting from the water, in addition to other factors driven by the atmosphere in which system 10 (e.g., temperature) is being used, all affect lighting conditions within chamber 25. Image processor 55 makes adjustments to camera 85 by way of these feedback signals to compensate for the changing conditions.

Figure 3:
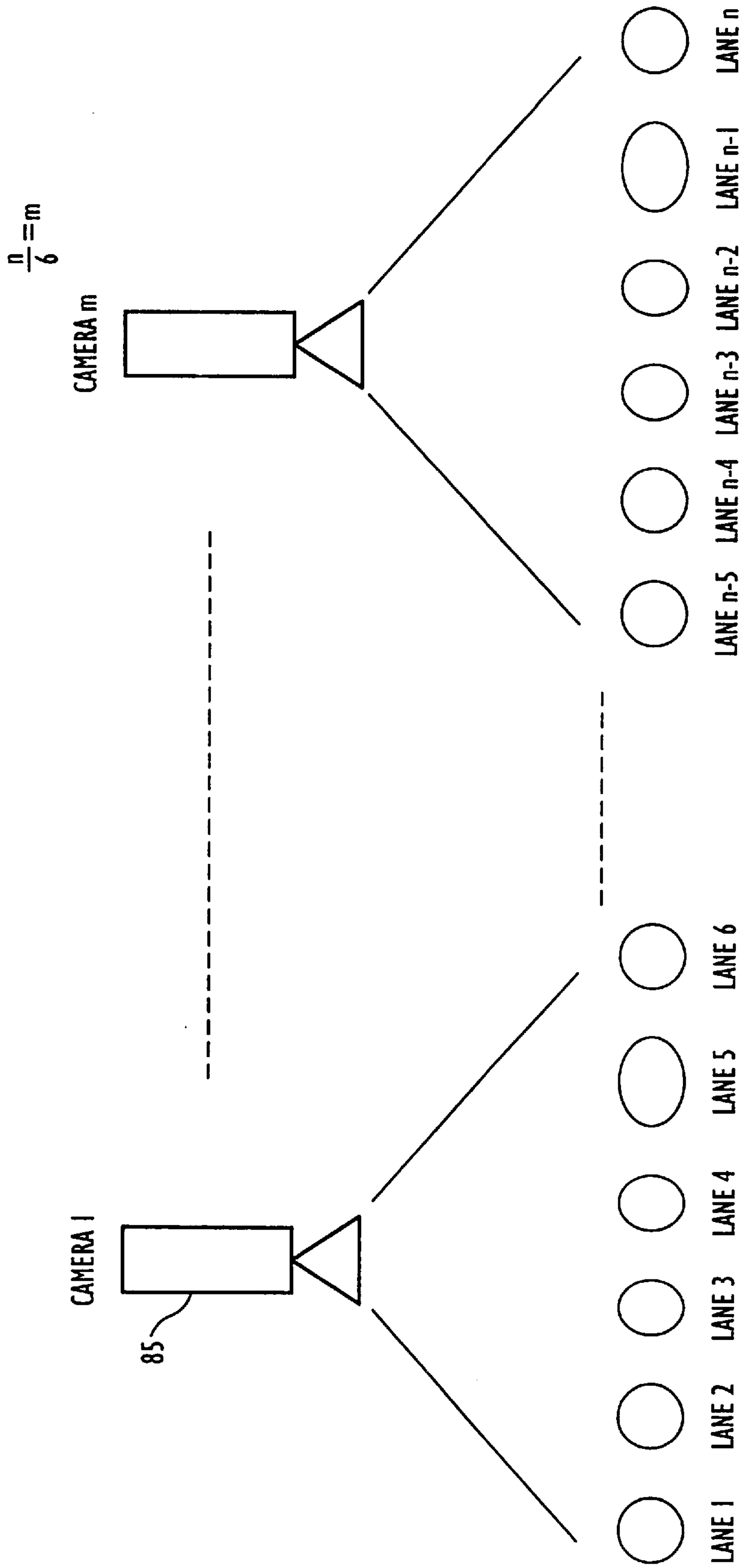
FIG. 3 illustrates cameras, each covering multiple conveyor lanes according to the preferred implementation.
Figure 4:
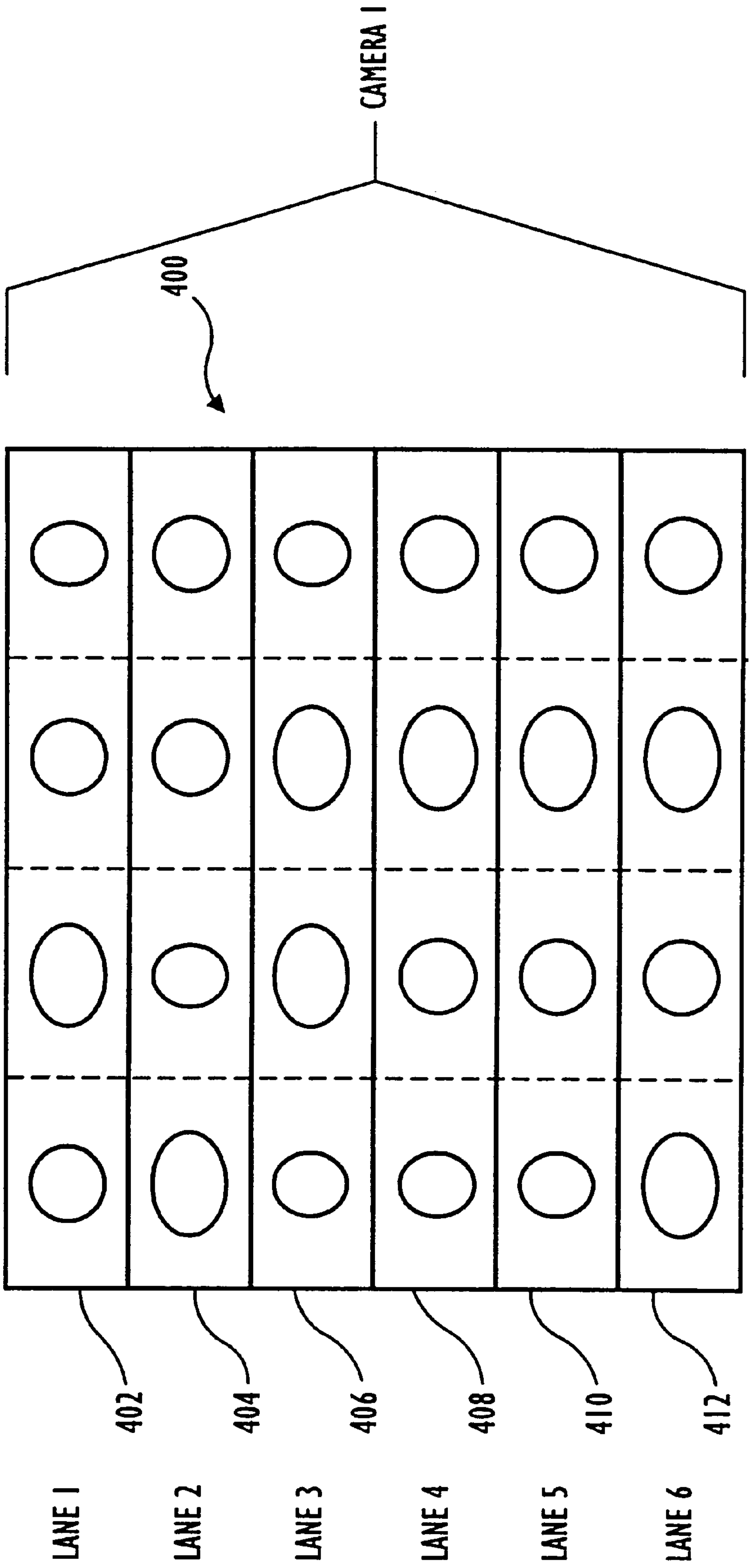
FIG. 4 illustrates a typical multiple lane image obtained by a camera according to the preferred implementation.

In a preferred implementation, camera 85 is synchronously activated to obtain images of multiple pieces of fruit in multiple lanes simultaneously. FIG. 4 illustrates the complete image 400 seen by camera 85 having a field of view that covers six lanes 402, 404, 406, 408, 410, and 412. FIG. 3 illustrates a plurality of n lanes covered by m cameras, where m=n/6. Thus, six lanes of 18 objects would be covered by three cameras (m=3), each camera having a field of view of six lanes. Image processor 55 keeps track of the location, including lane, of all objects 70 on conveyor 20 that pass through imaging chamber 25. Those of ordinary skill will recognize that this is a limitation of the camera equipment and not of the invention and that coverage of any number of lanes by any number of cameras having the needed capability is within the scope of the claimed invention.

Figure 5:
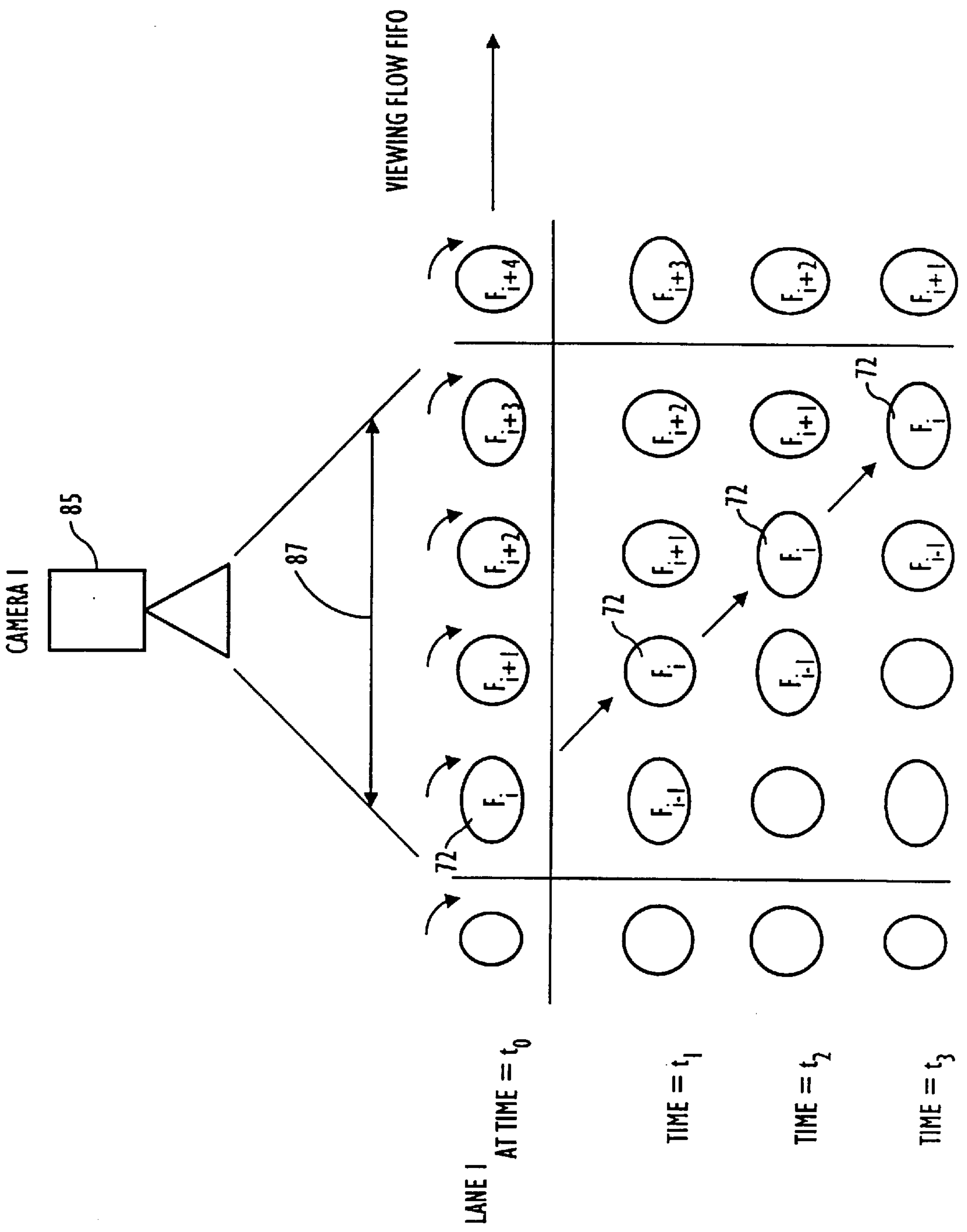
FIG. 5 illustrates the progress of an object through the imaging chamber of the defect removal system according to the preferred implementation.

FIG. 5 illustrates the progress of objects as they rotate through four positions within the field of view 87 of camera 85 within imaging chamber 25. FIG. 5 represents the four positions of the object 72 ($F_i$) in the four time periods from $t_0$ to $t_3$. Thus, images of four views of each object are obtained. It has been determined that these four views provide a substantially complete picture of each object. The number of views may be changed, however, without departing from the scope of the invention.

Synchronous operation with camera 85 allows the image processor 55 to route the images and to correlate processed images with individual objects. Synchronous operation can be achieved by an event triggering scheme controlled by encoder 92. In this approach any known event, such as the passage of an object past a reference point can be used to determine when the four objects (in one lane) are within the field of view of a camera, as well as when a camera has captured four images corresponding to four views of an object.

In this manner, system 10 separates objects with few or no defects from those considered to be defective for one or more reasons according to a rejection function. The rejection function R may be defined as follows:

$$R(t_d, D_i, O_i, F_r)$$

where $t_d$ is a time delay for the time required for an object to travel along conveyor 20 through imaging chamber 25 to ejector 100; where $D_i$ is a defect index assigned by image processor 55 to objects with defects (that exceed thresholds), for example, $D_0$ for good, $D_1$ for grade 1, and $D_2$ for grade 2; where $O_i$ represents the location of an object within the field of objects on the conveyor 20; and where $F_r$ is a rejection force used to signal ejector 100 as to how much force UF, if any, should be applied to separate objects with defects from those having only a few or no defects.

Mechanical System

Figure 6:
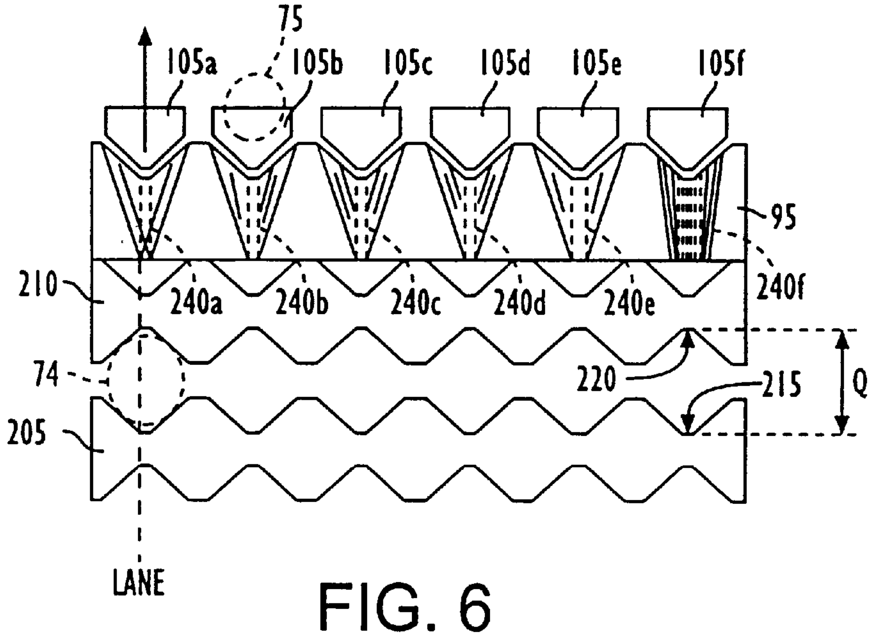
FIG. 6 is a top view of a portion of the defect removal system according to the preferred implementation.

The conveyor 20 is a closed loop conveyor comprised of a plurality of rods (also referred to as rollers) over which the objects 70 rotate through imaging chamber 25. FIG. 6 shows a top view of two rods 205 and 210 on conveyor 20 following imaging chamber 25. Belts (or other close loop device like a link chain) are located at either end of the rods to connect and drive the rods 205, 210, etc. Motor 80 drives the belts and encoder 92 (see FIG. 2) generates timing signals used to locate an object among the objects on conveyor 20 after the object begins to pass through imaging chamber 25 (and image processor 55 acquires a first image of one view of the object).

At the end of the last rod 210, is directional table surface 95, which is used to direct the objects to align them over top grooved portions 105*a–f* (or paddles) for each ejector. Top grooved portion 105 is a kind of paddle used to eject appropriate objects, i.e., ones with defects, from conveyor 20. Directional table surface 95 has multiple curved portions 240*a–f* used to direct objects over the grooved portions 105*a–f*.

FIG. 6 shows two objects 74 and 75. Object 74 is shown at rest on conveyor 20 between rods 205 and 210. The distance Q from the lowest point of one groove 215, i.e., the lower substantially flat portion, to the lowest point 220 of a groove on a succeeding rod is 3.25 inches. This distance may vary depending on the size of objects being processed. For apples it has been determined that 3.25 inches is the best distance Q.

Figure 7:
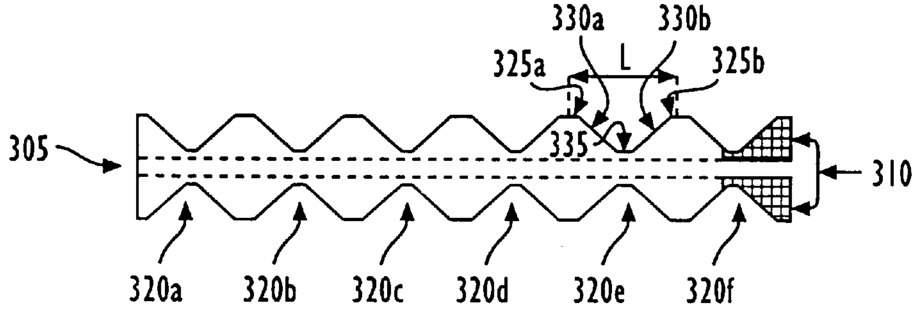
FIG. 7 illustrates a roller of the conveyor of a portion of the defect removal system according to the preferred implementation.

Each rod, as shown in FIG. 7, is comprised of an inner cylindrical portion 305 and an outer grooved portion 310. The inner cylindrical portion 305 may be comprised of an solid metal or plastic capable of withstanding the high speed action of the system 10. The outer grooved portion 310 is comprised of a solid rubber or flexible material, which must also be capable of withstanding the high speed action of the system 10. The material used for the outer grooved portion 310 must be pliable enough so as not to damage objects passing over the conveyor 20.

Outer grooved portion 310 includes a plurality of grooves 320*a–f*. It is the area within these grooves 320*a–f* on two adjacent rods that objects may rest during transport along conveyor 20. The length L of each groove is approximately 4 inches, depending on the size of the objects being processed. For apples it has been determined that 4 inches is the best length L, but this length may be adjusted for processing objects of varying sizes. Each groove includes two top portions 325*a* and 325*b*, two side angled portions 330*a* and 330*b* and a lower substantially flat portion 335. Together, these portions form a V-shaped groove with a flat bottom as shown in FIG. 7. Additionally, holes (not shown) located in the end of each rod are used to connect each rod to pins on the chain or belt (not shown) that drive all rods on conveyor 20.

Figure 8:
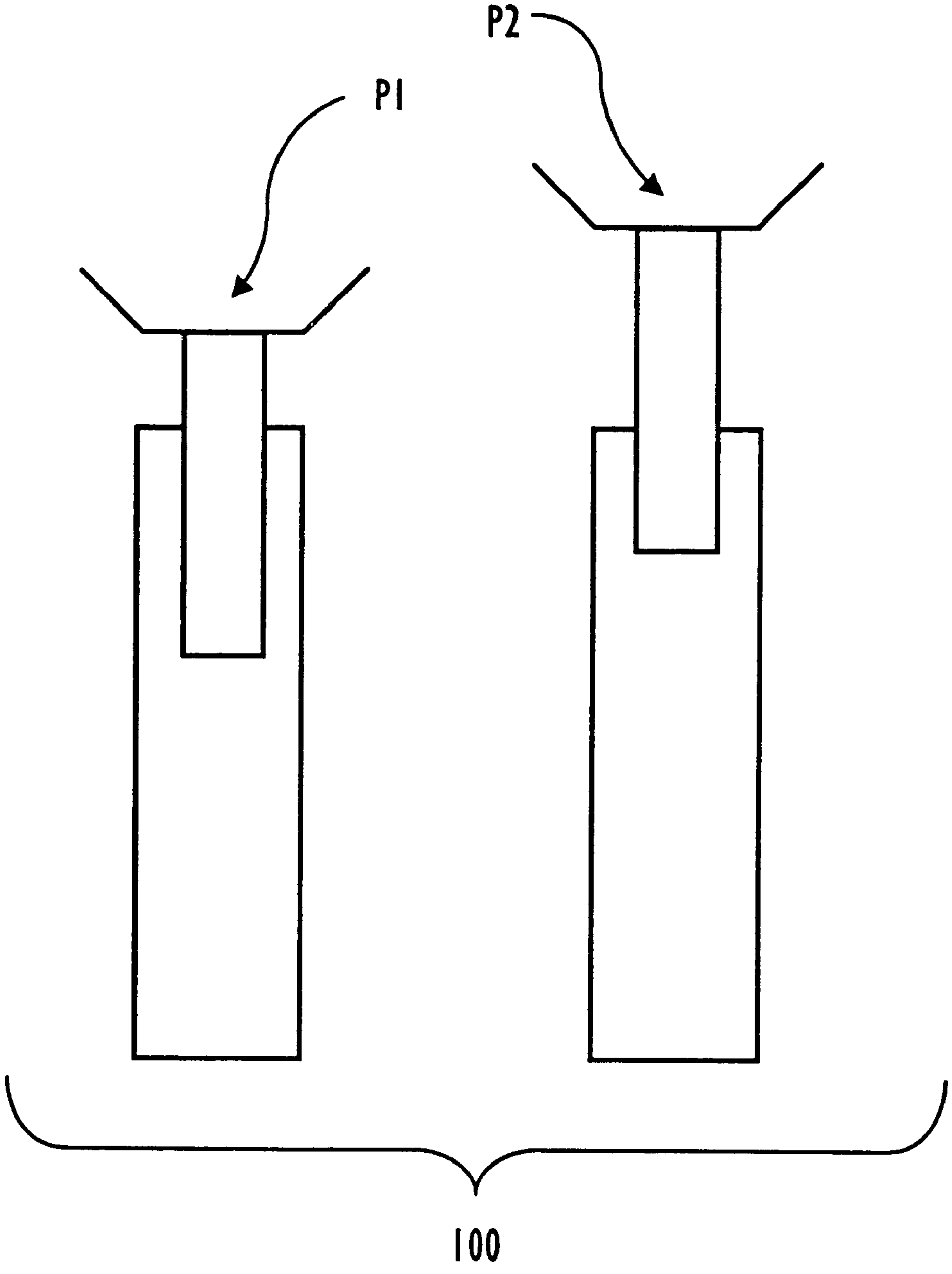
FIG. 8 illustrates three positions of object-removal lift according to the preferred implementation.

As FIG. 8 shows, each ejector, like ejector 100, has two positions. The first, down position Pi is used to permit objects with only a few or no defects to pass on to conveyor 35. The second position P2 is used to eject objects that fall within a first or second category of objects with defects to conveyor 40 or 45. The speed at which the ejector moves from Pi to P2 determines whether the object is sent to conveyor 40 or conveyor 45. One skilled in the art will recognize that a pneumatic controller may control operation of the ejector, or another type of controller may be used without departing from the scope of the invention. Such a controller would interpret the ejector signals from image processor 55 and drive the ejectors accordingly.

General Image Processing Operation

Figure 9:
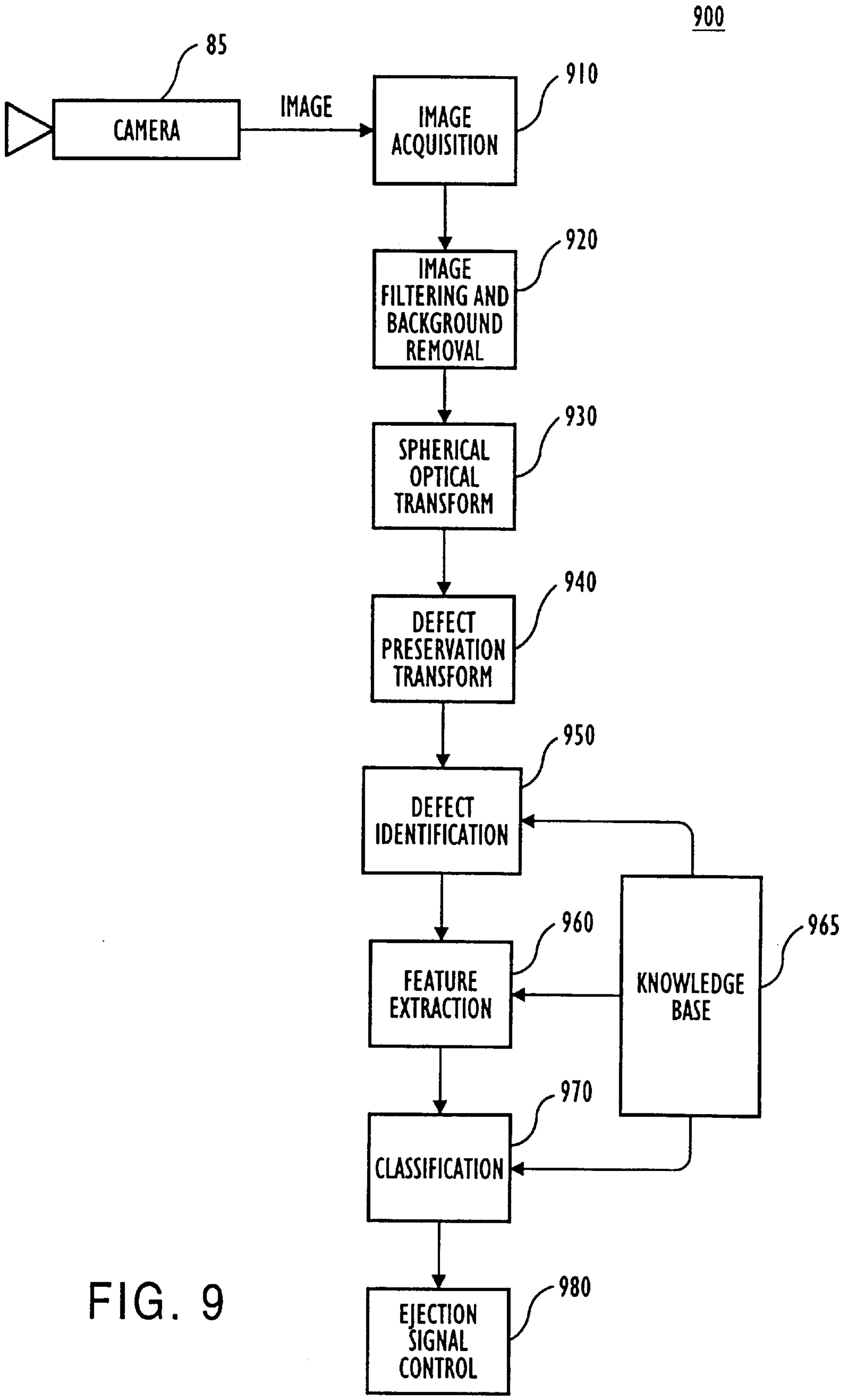
FIG. 9 is a flow chart of the vision analysis process according to the preferred implementation.

FIG. 9 is a flow chart of the vision analysis process 900 performed by image processor 55 and FIGS. 10–15 illustrate corresponding views of the an image during each step of the process 900. The vision analysis process 900 uses various image manipulation algorithms implemented in software.

Figure 10:
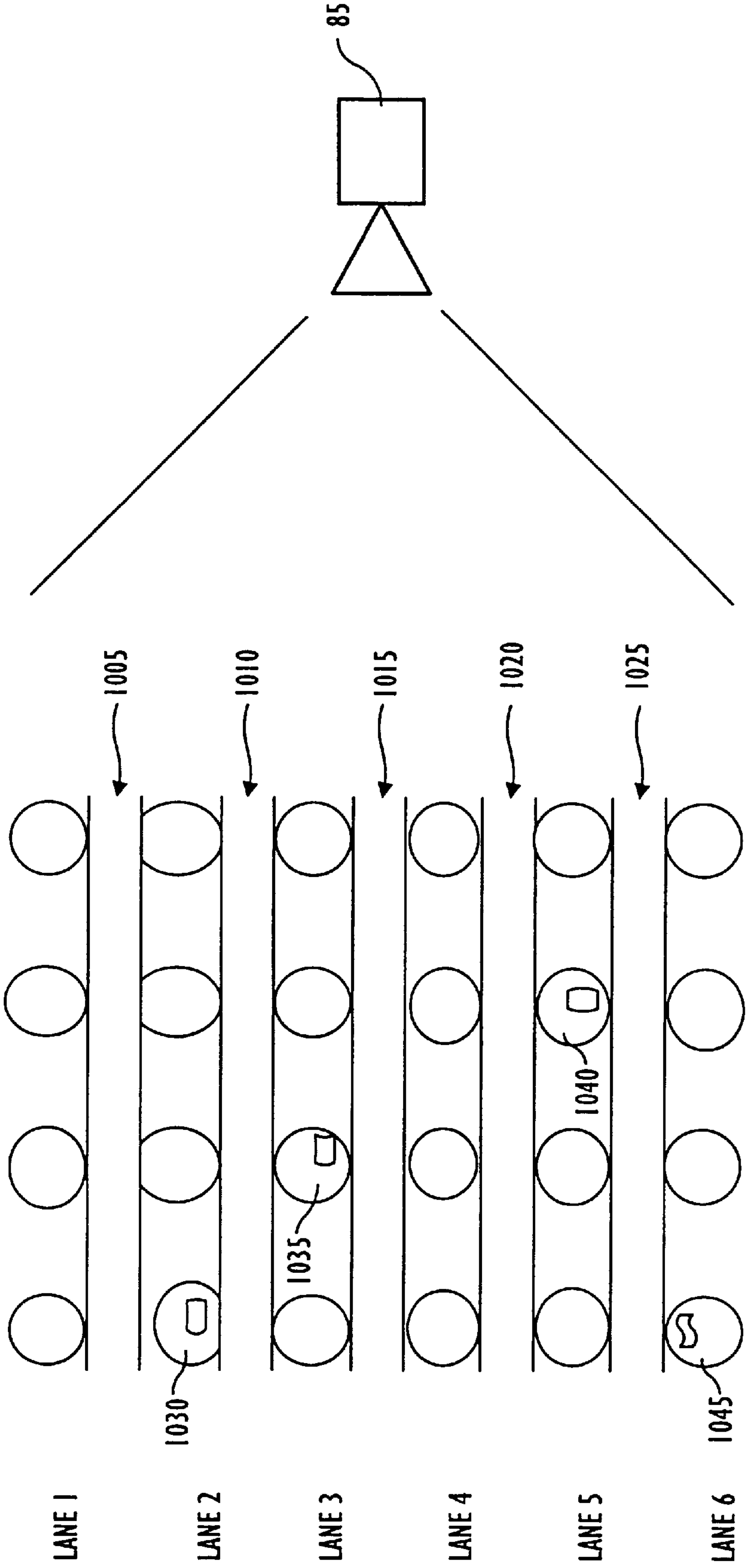
FIGS. 10–15 are images of objects used to describe the vision analysis process according to the preferred implementation.

At first, image processor 55 acquires from a camera, for example, camera 85, an image 1000 of a plurality of objects on conveyor 20 passing within imaging chamber 25 (step 910). As shown in FIG. 10, the image 1000 includes six lanes of four objects for a total of 24 objects. Also included in the image are rods 1005, 1010, 1015, 1020, and 1025 of conveyor 20. Note that objects 1030, 1035, 1040, and 1045 have marks that indicate that these objects may be defective.

The image 1000 is comprised of a plurality of pixels. The pixels are generated by converting the video signals from the cameras through analog to digital (A/D) converters. Each pixel has an intensity value or level corresponding to the location of that pixel with reference to the object(s) shown in the image 1000. For example, the gray level of pixels around the perimeter of objects is lower (darker) than the level at the top presenting a gradience from center to boundary of each object shown in FIG. 16. In other words, in the image 1000 the top of objects appears brighter than the perimeter. Also, defects within the objects appear in the image 1000 with a low gradient value (dark). This will be explained further below.

Figure 11:
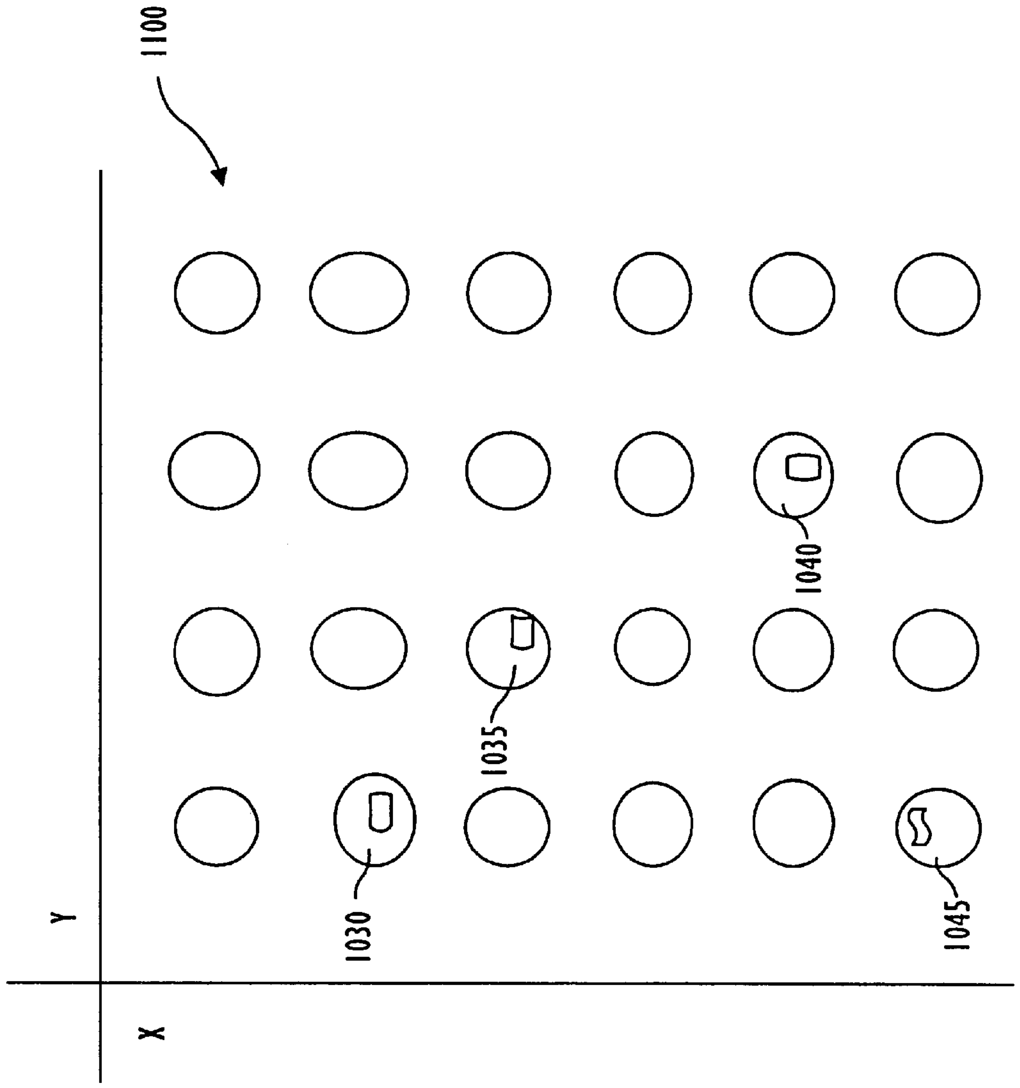

Next, image processor 55 filters the rods and other background noise out of image 1000 (step 920). Known image processing techniques such as image gray level thresholding may be used for this step. Since, in the preferred implementation, rods 1005, 1010, 1015, 1020, and 1025 are dark blue or black, they can be easily filtered from image 1000. This step results in a view 1100 of image 1000 with only the objects shown. This view is illustrated in FIG. 11. For easy reference, FIG. 11 also includes an X-Y plot, which is used to identify the location of specific objects, such as objects 1030, 1035, 1040, and 1045, in the image 1000.

After image processor 55 filters the rods and other background noise from image 1000 (step 920), it processes portions of image 1000 corresponding to the location of objects in image 1000, according to a spherical optical transform and a defect preservation transform (steps 930 and 940). The order in which image processor 55 performs the operations of these two steps is not particularly important, but in the preferred implementation the order is spherical optical transform (step 930) followed by defect preservation transform (step 940).

Figure 16:
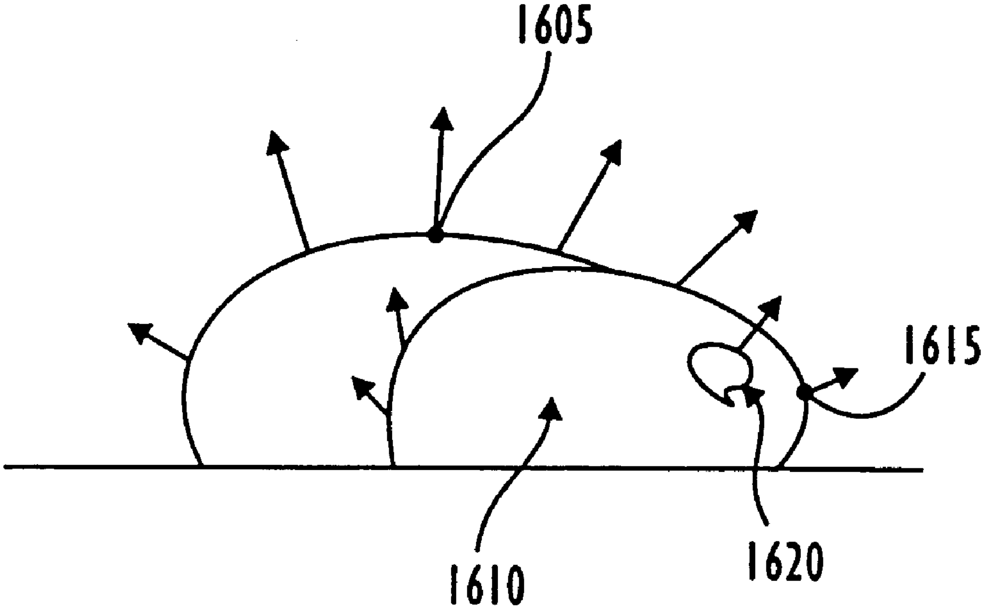
FIG. 16 is a diagram illustrating surface light reflectance levels of objects as viewed by cameras.

In general, spherical optical transform (step 930) performs image processing operations on the picture of each object shown in image 1000 to compensate for the non-lambertian gradient on spherical objects at their curvatures and dimensions. Each picture to be processed by system 10, e.g., an apple, is substantially spherical in shape. The surface light reflectance level of camera 85 is not uniformly distributed with gradient low energy around each object's boundaries, as shown in FIG. 16. Reflectance level at point 1605, the highest most point on a side 1610 of an object such as an apple, is greater than the reflectance level at point 1615. Thus, the pixel of an image corresponding to point 1605 will be brighter than the pixel corresponding to point 1615.

The reflectance levels at various points are illustrated in FIG. 16 by the length of the arrows pointing upward out of the side 1610 of the illustrated object. The reflectance level from a defect 1620 in the side 1610 is also low. All these differences in reflectance levels must be considered when determining the true defect on an object based on a view of only a side 1610 of the object. In step 930, image processor 55 performs the necessary image processing functions to compensate for the varying reflectance levels of objects and to determine each object's true shape based on the geometries and optical light reflectance on the surface of each object.

Image processor 55 also performs a defect preservation transform (step 940). In this step, image processor 55 identifies defects in images of objects shown in image 1000, distinguishing between the defects in objects from background. In some instances, defects may appear in images with intensity levels below the intensity level for the background of an image. The background for images from camera 85 has a predetermined intensity level. Image processor 55 identifies and filters out of an image the background, separating background from objects shown in an image. However, some points in defects may appear extremely dark and even below the intensity level of the background. To compensate for this, image processor performs a defect preservation transform (step 940), which makes sure that defects are treated as defects and not background.

Figure 12:
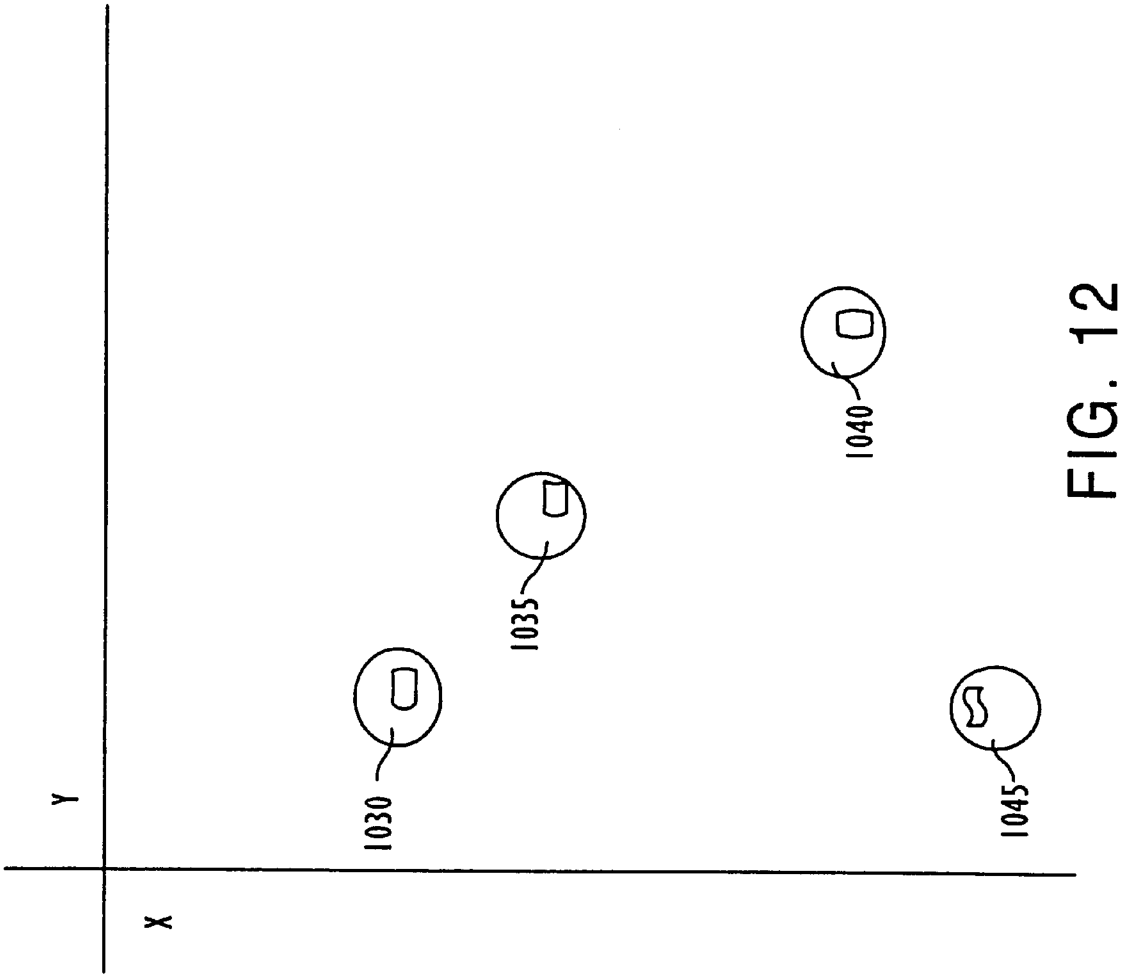
Figure 13:
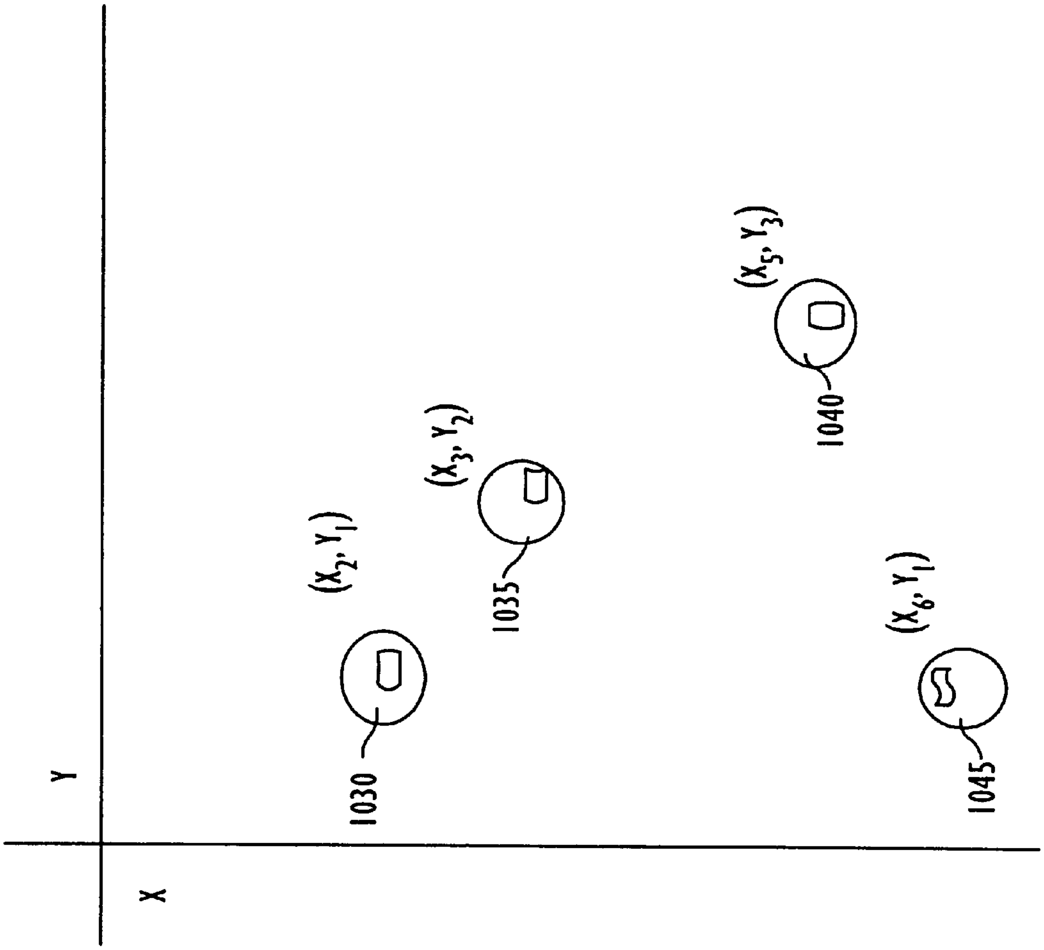

Further details on these transforms will be described below. The steps 930 and 940 provide the necessary information for image processor 55 to distinguish objects shown in the image 1000 that have possible defects, i.e., objects 1030, 1035, 1040, and 1045, from those that do not. This means that only those objects shown in image 1000 with potential defects need to be further processed by image processor 55. FIGS. 12 and 13 show the objects shown in image 1000 with potential defects, i.e., objects 1030, 1035, 1040, and 1045, separated from the remaining objects of image 1000. FIG. 13 differs from FIG. 12 in that it provides the added information on the location of the objects shown in image 1000 with potential defects, i.e., objects 1030, 1035, 1040, and 1045, relative to the remaining objects shown in the image 1000. For example, object 1030 is at location $X_2, Y_1$ in image 1000.

For defect identification (step 950), feature extraction (step 960), and classification (step 970), image processor 55 uses information from knowledge base 965. Knowledge base 965 includes data on the types of defects and the characteristics or features of those types of defects. It also includes information on classifying objects in accordance with the identified defects and features of those defects. The range of defects is quite broad, including defects from at least rots, decays, limb rubs, scars, cavities, holes, bruises, black spots, and damages from insects.

Figure 14:
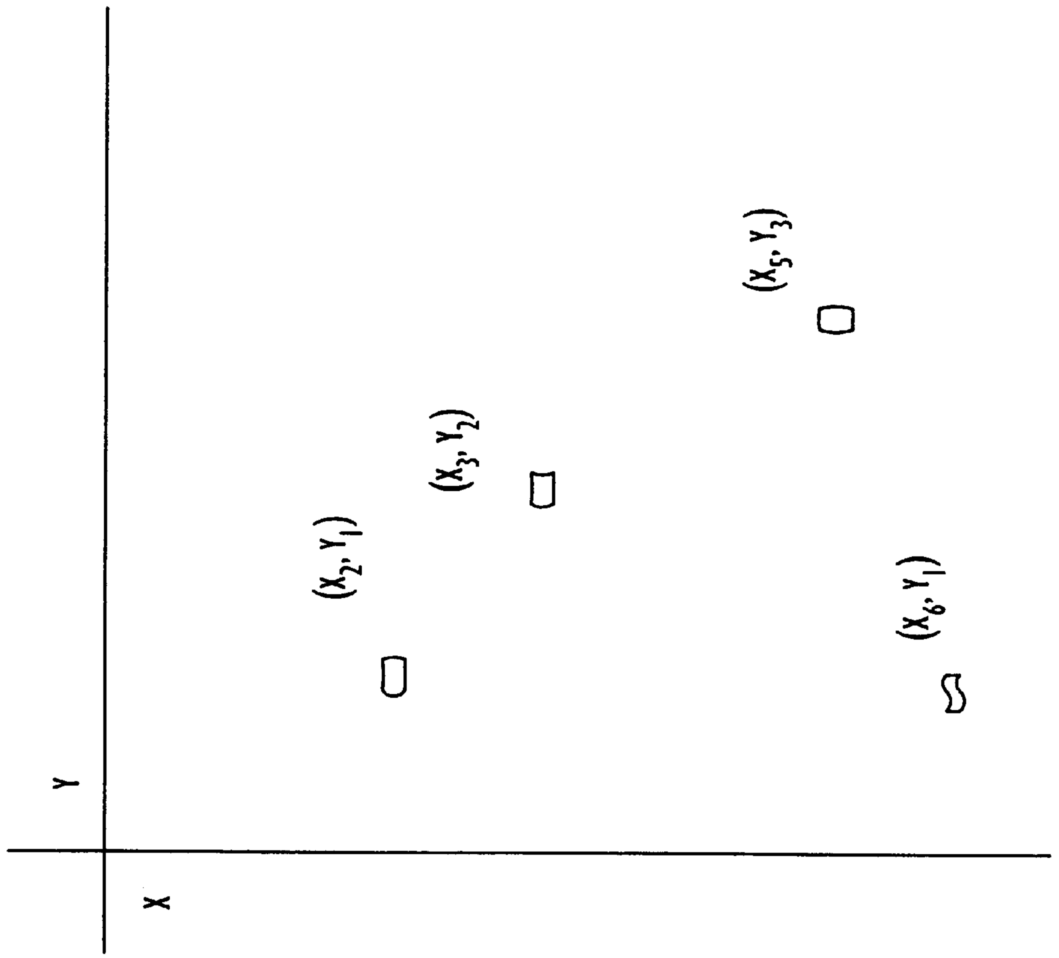

Image processor 55 identifies defects in each object by examining the image of each object that was previously determined in steps 930 and 940 as containing a possible defect (step 950), e.g., objects 1030, 1035, 1040, and 1045. In this examination, image processor 55 first separates a defect segment of the image of each object to be examined, e.g., objects 1030, 1035, 1040, and 1045. The defect segments for objects 1030, 1035, 1040, and 1045 are shown in FIG. 14. This defect segmentation could not be done effectively without the information on each object determined in steps 930 and 940.

Figure 15:
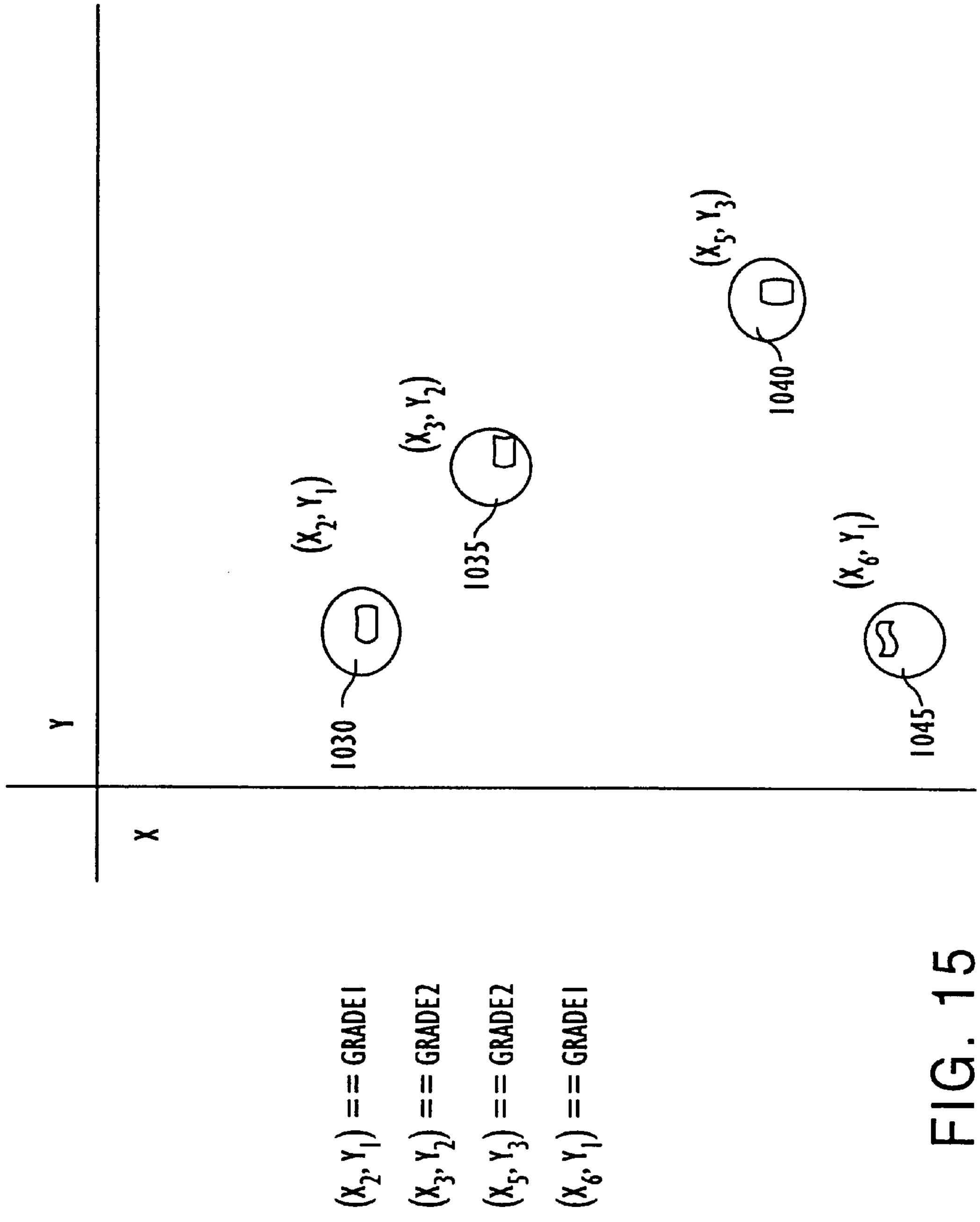

Image processor 55 then extracts features of the defect segments (step 960). Such features include size, intensity level distribution (darkness), gradience, shape, depth, clusters, and texture. Image processor 55 then uses feature information on each defect segment identified in the image of each object to determine a class or grade for that object (step 970). In the preferred implementation, there are three classes: good, grade 1, and grade 2. For example, image processor 55 determined that object 1030 and object 1045 fall within the grade 1, and object 1035 and object 1040 fall within grade 2. This is illustrated in FIG. 15. Based on the classification determined in step 970, image processor 55 generates the appropriate ejection control signals for controlling ejector 100 (step 980).

Figure 17:
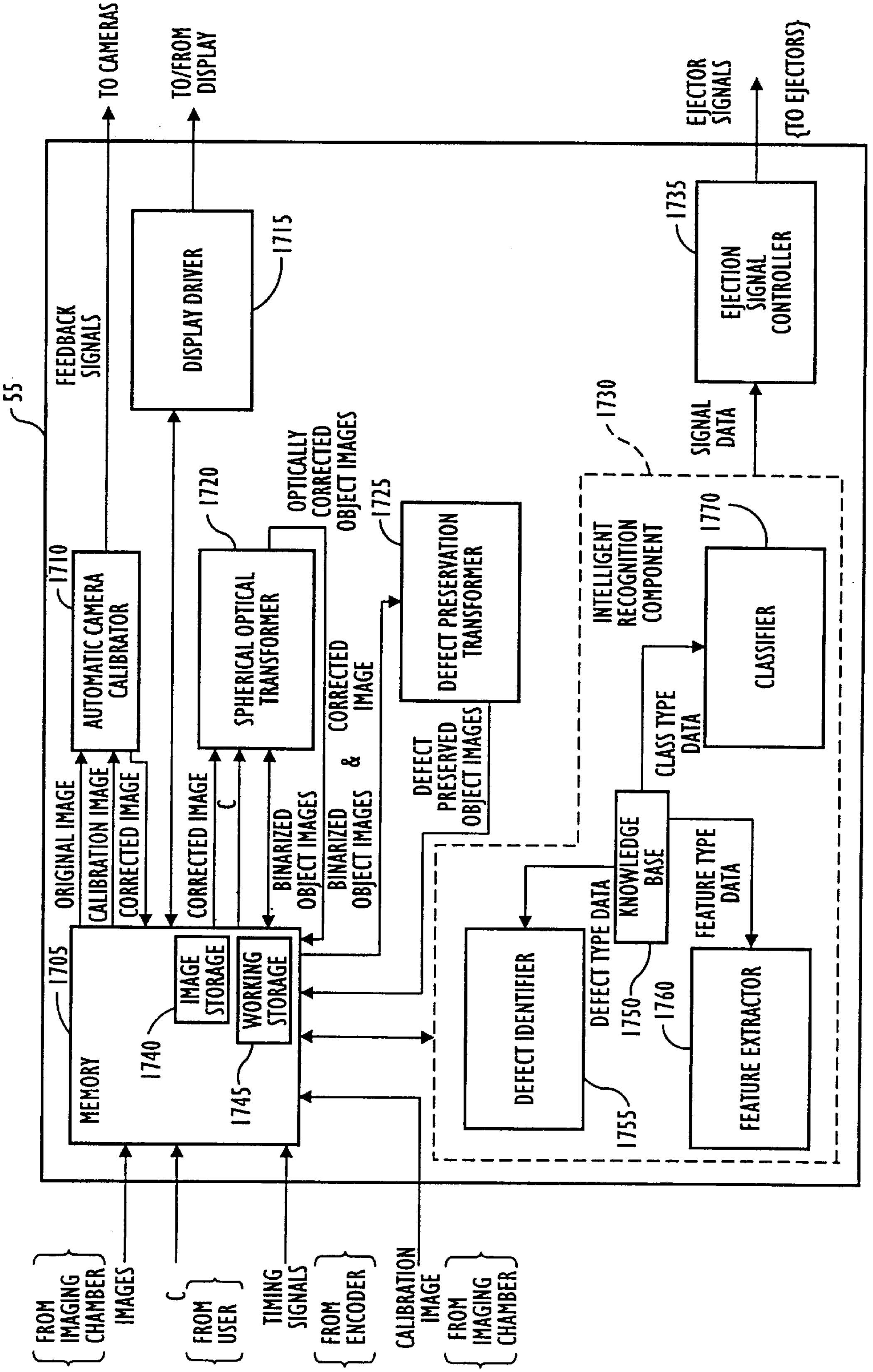
FIG. 17 is a block diagram illustrating image processing hardware and software utilized according to the preferred implementation.

Referring now to FIG. 17, further details on image processor 55 will be provided. Image processor 55 is comprised of memory 1705, automatic camera calibrator 1710, display driver 1715, spherical optical transformer 1720, defect preservation transformer 1725, intelligent recognition component 1730, and ejection signal controller 1735. Memory 1705 includes image storage 1740 and working storage 1745. Memory 1705 also includes knowledge base 1750; though knowledge base 1750 is illustrated in FIG. 17 as part of intelligent recognition component 1730 to provide a more clear understanding and illustration of image processor 55. Intelligent recognition component 1730 also includes defect identifier 1755, feature extractor 1760 and classifier 1770.

Memory 1705 receives images from cameras in imaging chamber 25. Memory 1705 also receives a constant C, which is used by spherical optical transformer 1720 and will be described in further detail below. Memory 1705 also receives timing signals from encoder 92 of conveyor 20. Timing signals from encoder 92 are used to coordinate ejector signals generated by ejection signal controller 1735 with appropriate objects based on the images of those objects as processed by image processor 55. Finally, memory 1705 receives a calibration image from imaging chamber 25. Specifically, a reference object is placed within imaging chamber 25 to provide a calibration image for calibrating cameras (like camera 85) during operation. Automatic camera calibrator 1710 receives an original image of objects on conveyor 20 as well as a calibration image of the reference object within imaging chamber 25. Automatic camera calibrator 1710 then corrects the original image and stores the corrected image in image storage 1740 of memory 1705. Automatic camera calibrator 1710 also provides feedback signals to cameras in imaging chamber 25 to account for changes in atmosphere within imaging chamber 25.

Spherical optical transformer 1720 uses the corrected image from image storage 1740 of memory 1705, and C from memory 1705, which was previously supplied by a user. For each object shown in the corrected image, spherical optical transformer 1720 generates a binarized object image (BOI) and stores the BOIs in working storage 1745. Using the BOIs as well as the corrected image, spherical optical transformer 1720 generates optically corrected object images for each object in the corrected image. Defect preservation transformer 1725 also uses the BOI from memory 1705 and the corrected image from memory 1705 to generate defect preserved object images for each object shown in the corrected image. The optically corrected object images and defect preserved object images are provided to the intelligent recognition component 1730.

Knowledge base 1750 provides defect type data to the defect identifier 1755, feature type data to feature extractor 1760 and class type data to classifier 1770. Using the optically corrected object images and defect preserved object images, intelligent recognition component 1730 performs the functions of defect identification, (defect identifier 1755), feature extraction (feature extractor 1760), and classification (classifier 1770). Based on determinations made by the intelligent recognition component 1730, signal data is provided to ejection signal controller 1735. This signal data corresponds to the three grades: available for classifying objects examined by image processor 55. Based on the signal data, ejection signal controller 1735 generates ejector signals to appropriate ones of the ejectors of system 10. In response to these ejector signals the ejectors are activated to separate objects classified as grade 1 and grade 2 objects from those objects classified as good objects by intelligent recognition component 1730.

Spherical Optical Transformer

Figure 18:
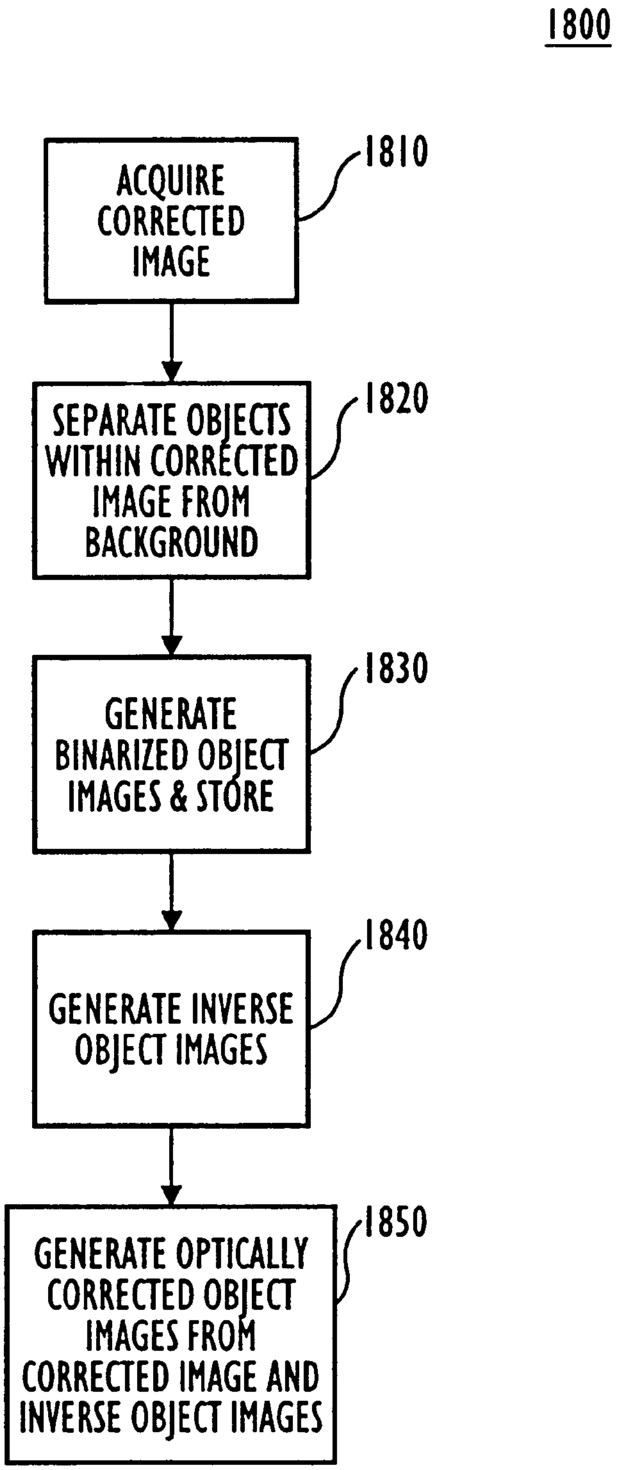
FIG. 18 is a functional flow chart illustrating the spherical optical transformer algorithm performed according to the preferred implementation.

Spherical optical transformer 1720 is implemented in computer program instructions read in the C/C++ programming language. The microprocessor of image processor 55 executes these program instructions. FIG. 18 illustrates a procedure 1800 which is a flow diagram of the processes performed by the spherical optical transformer 1720.

The spherical optical transformer 1720 first acquires the corrected image from memory 1705 (step 1810). For each object in the corrected image, the spherical optical transformer then separates the object within the corrected image from the background to inform corrected object images (COIs) (step 1820). The spherical optical transformer 1720 can now generate BOIs for the objects in the corrected image which it then stores in memory 1705 (step 1830). Using the BOIs and the corrected image, the spherical optical transformer 1720 then generates inverse object images (IOIs) corresponding to each object in the corrected image (step 1840). Using the IOIs, BOIs, as well as the corrected image, spherical optical transformer 1720 then generates optically corrected object images (step 1850).

Figure 19:
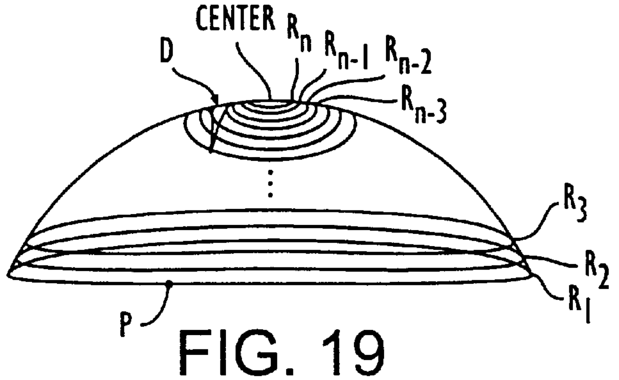
FIG. 19 schematically illustrates a corrected object image produced by software utilized according to the preferred implementation.
Figure 20:
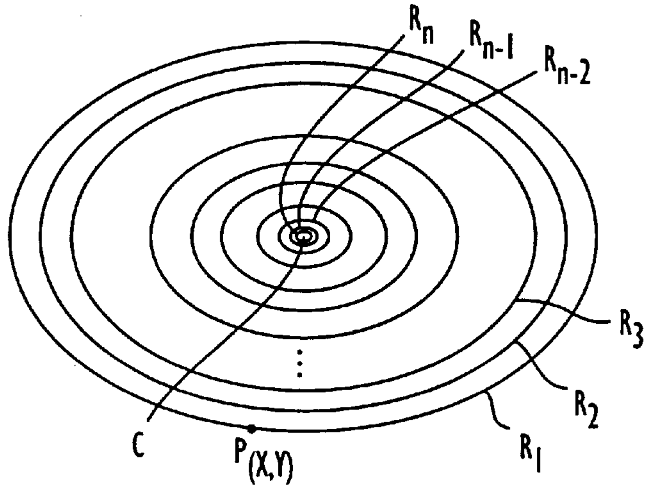
FIG. 20 is a binarized object image produced according to the preferred implementation.
Figure 21:
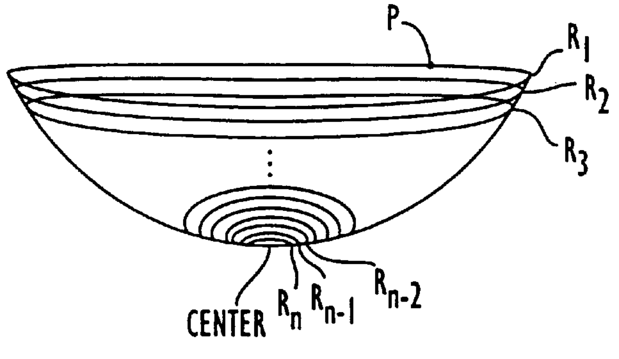
FIG. 21 is an inverse object image produced according to the preferred implementation.

FIG. 19 illustrates a single COI from among the objects in a corrected image. As illustrated in FIG. 19, the COI is comprised of many contour outlines ($R_1$ through $R_n$) These contour outlines form the image of a view of an object as viewed by camera 85. Pixels corresponding to the center top-most point of the COI have a high intensity value, i.e., are brighter, than pixels forming the lowermost contour outline $R_1$ in the COI. Additionally, pixels forming the defect D in the corrected object image have a low intensity value (dark) which may be as low or even lower than the background pixels. From the COI, spherical optical transformer 1720 generates a BOI. FIG. 20 illustrates a BOI corresponding to the COI illustrated in FIG. 19.

As illustrated in FIG. 20, the BOI no longer includes the "depth" of the COI. Though the gray levels of the COI have been eliminated in the BOI, the geometric shape of the COI is maintained in the plurality of contour outlines ($R_1$ to $R_n$) of the BOI illustrated in FIG. 20.

Each pixel of the COI has a horizontal and vertical position. Each pixel also has an intensity value. By taking away the intensity value but maintaining the pixel locations, the BOI is generated by the spherical optical transformer 1720. The system 10 permits a user to provide a constant C which is used to generate an IOI. The constant C is based on the saturation level of 255 and, in the preferred implementation, a constant C of 200 has been selected.

To generate the IOI, spherical optical transformer 1720 uses a spherical transform function, which is defined as follows:

| | | |
|---|---|---|
| sph() = { | IOI($P_{i,j}$) <=> C − BOI($P_{i,j}$) | |
| | where for each $P_{i,j}$ in a $R_k$ of BOI | |
| | $P_{i,j}$ = StdVal (k) | |
| | K = 1,2, . . . n | }. |

In this function, P stands for pixel and $P_{i,j}$ represents a specific pixel location (i being horizontal and j being vertical) in the BOI. The pixel locations are determined based on the geometric shape of the COI. Each pixel $P_{i,j}$ of the BOI will have a corresponding point $P_{i,j}$ in the IOI. By setting a standard value (StdVal(k)) for the intensity or gradient level for each pixel in a particular contour outline R of the n contour outlines that form the COI, spherical optical transformer 1720 can generate an intensity value for each pixel of the IOI. StdVal(k) values are related to the typical gradience of objects' reflectance received by camera in the imaging chamber 25. The values are obtained through experimentation. The constant C provided by the user is used in this function as well.

For example, if C=200 and the StdVal(1)=140, then all pixels ($P_{i,j}$) of contour outline $R_1$ (k=1) in the IOI will be set to an intensity level of 60.

This spherical transform function is operated on each pixel $P_{j,i}$ in the BOI to generate the IOI. Once the spherical optical transformer 1720 has generated the IOI, it generates an optically corrected object image (OCOI) by using a summation process that effectively adds the COI to the IOI pixel by pixel.

Figure 22:
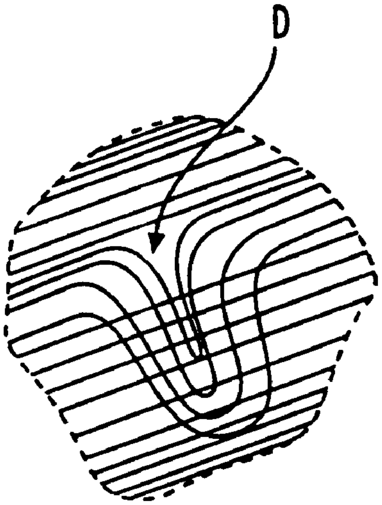
FIG. 22 is an optically corrected object image produced according to the preferred implementation.

Using this process, an IOI having the exact geometric shape dictated by the BOI can be generated. Summing the IOI together with the COI generates the OCOI (COI+IOI=>OCOI). The OCOI is substantially a plane image with the defect from the COI, as shown in FIG. 22.

Figure 23:
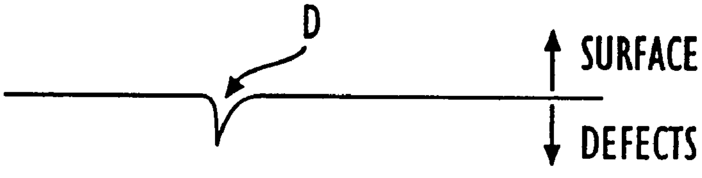
FIG. 23 is a side view of the optically corrected object image of FIG. 22.

The image processing performed by spherical optical transformer 1720 involves a morphological convolution process during which a structure element such as a 3×3, 5×5, or 7×7 mask is recursively eroded over the original corrected image. FIG. 23 is a side view of the OCOI to further highlight the defect D. Defect segmentation is made possible by removing normal surface through a threshold. The threshold is adjustable for user on-line defect sensitivity adjustment. Those skilled in the art will recognize that the spherical transform function may be used to generate an inverse image of an object without limitation as to the size and/or shape of the object.

Defect Preservation Transformer

Figure 24:
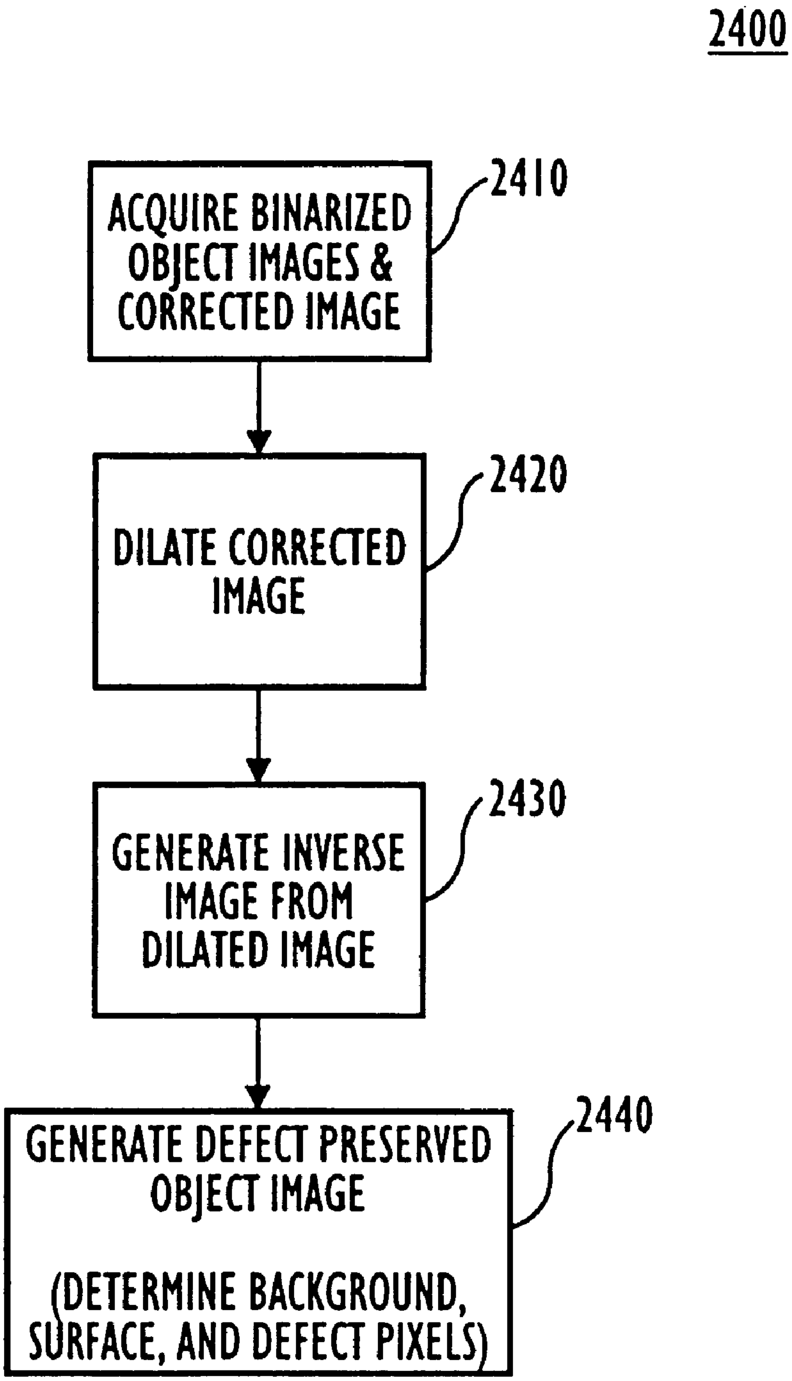
FIG. 24 is functional flow chart of the defect preservation transformation algorithm utilized according to the preferred implementation.

FIG. 24 illustrates procedure 2400 performed by defect preservation transformer 1725. Like spherical optical transformer 1720, defect preservation transformer 1725 is comprised of program instructions written in the C programming language. The microprocessor of image processor 55 executes the program instructions of defect preservation transformer 1725.

In step 2410, defect preservation transformer 1725 first acquires from memory 1705 the BOIs generated by spherical optical transformer 1720 and previously stored in memory 1705. Defect preservation transformer 1725 also acquires from memory 1705 the corrected image (step 2410). Combined, the corrected image (which includes all COIs for the objects) and BOIs provide a binary representation for each object in the corrected image, for example, the binary matrix A 2505 in FIG. 25. Background pixels are 0's, surface pixels are 1's, and pixels corresponding to defects are also 0's. The problem is that in this binary form, it is impossible to determine which of the 0's in binary matrix A 2505 represents background and which represents defects.

Using reference points for the geometric shape of each object in the corrected image, which reference points are found in the BOI, defect preservation transformer 1725 dilates the corrected image to generate for each object in the corrected image a dilated object image, for example, matrix B 2510 (step 2420). Dilation is done by changing the binary value for all background pixels from 0 to 1. Dilation is also done using recursive convolution and a structured element such as a 3×3, 5×5, or 7×7 mask.

Figure 25:
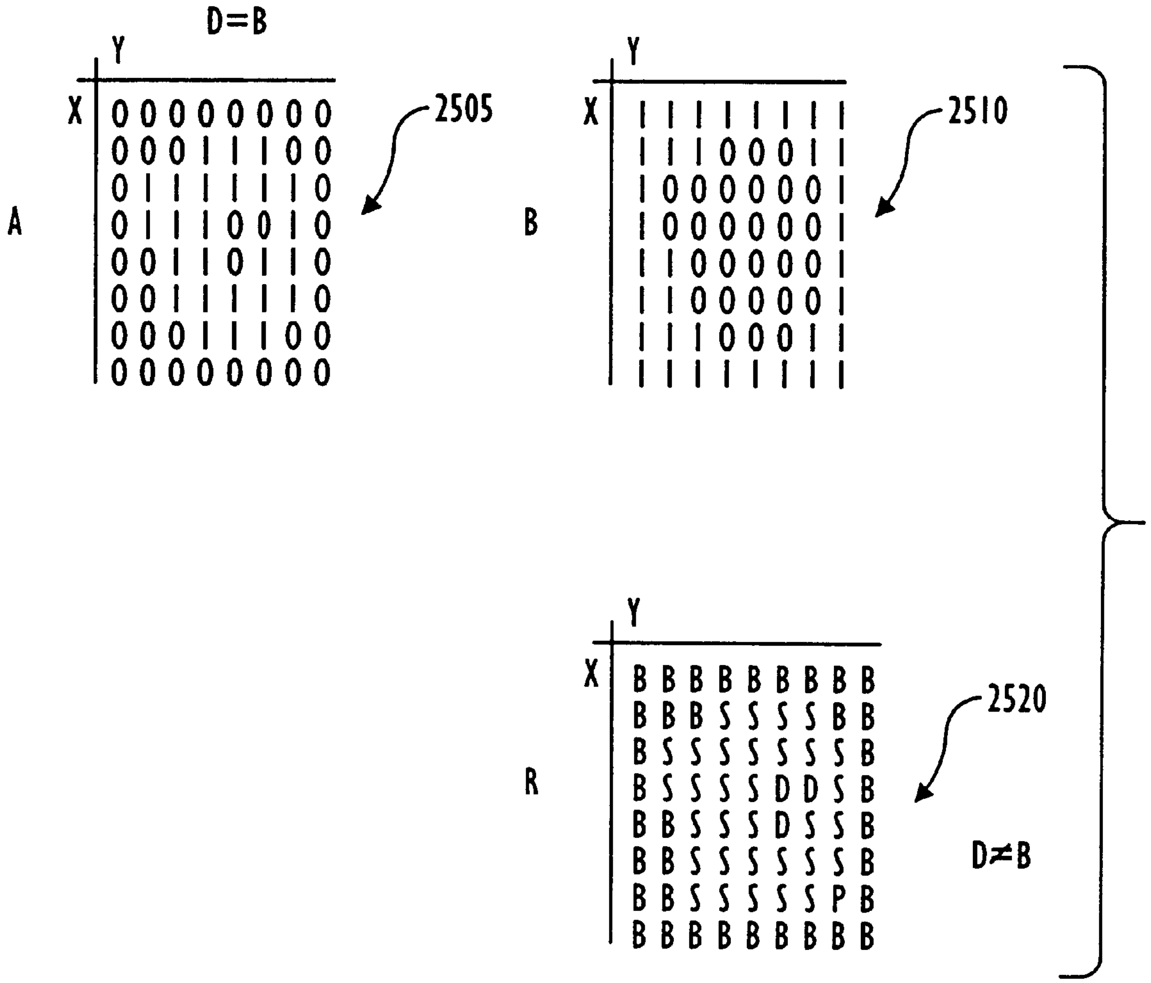
FIG. 25 illustrates matrices compiled by the defect preservation transformation algorithm according to the preferred implementation.

In step 2430, defect preservation transformer 1725 generates the dilated object image (for each object in the correct image). The matrix A 2505 and matrix B 2510 is illustrated in FIG. 25. Combining the matrix B 2510 with matrix A 2505, the defect preservation transformer 1725 can now distinguish between pixels that represent background and pixels that represent defects as well as the surface of an object (step 2440). As shown in matrix R, if a pixel in matrix A 2505 has the value 0 and a pixel in the matrix B has the value 1 then that pixel is a background B in the corrected image. Thus, as shown in matrix R, if $A_{x,y}$=0 and $B_{x,y}$=1 then pixel is background (B);

if $A_{x,y}$=0 and $B_{x,y}$=0 then pixel is defect (D); and if $A_{x,y}$=1 and $B_{x,y}$=0 then pixel is surface (s).

This function is particularly important in those circumstance where the intensity value of defects is lower (darker) than background pixels.

Intelligent Recognition Component

Using optically corrected object images and defect preserved object images, intelligent recognition component 1730 of image processor 55 determines the grade of particular objects in each image. The optically corrected object images and defect preserved object images provide information on the depth and shape of defects. This way the intelligent recognition component 1730 can process only those segments within an image that correspond to the defects (i.e., defect segments) separate from the remainder of the image. For example, if the depth of a defect segment in an object exceeds predetermined threshold levels, then that object would be determined by intelligent recognition component 1730 to be of grade 1. If the size and shape of a defect segment in an object exceeds predetermined threshold levels, then that object would be determined by intelligent recognition component 1730 to be of grade 2. The intelligent recognition component 1730 makes these grading determinations based on the size, gradient level distribution (darkness), shape, depth, clusters, and texture of defect segments in an object.

The critical part of the intelligent recognition component is knowledge base 1750. In the preferred implementation, knowledge base 1750 is built by using images of sample objects to establish rules about defects. These rules can then be applied to defects found in objects during regular operation of system 10.

Persons skilled in the art will recognize that the present invention described above overcomes problems and disadvantages of the prior art. They will also recognize that modifications and variations may be made to this invention without departing from the spirit and scope of the general inventive concept. For example, the preferred implementation was designed to examine apples and other fruit but the invention is broader and may be used for defect analysis of other types of objects such as golf balls, baseballs, softballs, etc.

Additionally, throughout the above description of the preferred implementation, other implementations and changes to the preferred implementation were discussed. Thus, this invention in its broader aspects is therefore not limited to the specific details or representative methods shown and described.

I claim:

1. A defective object identification and removal system having a conveyor that transports a plurality of objects through an imaging chamber with a camera disposed within the imaging chamber to capture images of the transported objects, the system comprising:

an image processor for identifying, based on the images, defective objects from among the transported objects by performing a curvature transform on the images to correct the images for differences in gradation caused by differences in light reflectance of the objects and detecting defects in the objects using the corrected images, and for generating defect selection signals when the defective objects have been identified; and an ejector controller for generating signals to remove the defective objects from the conveyor in response to the defect selection signals.

2. The system of claim 1 wherein the image processor generates plane images corresponding to the images captured by the camera.

3. The system of claim 1 wherein the image processor separates portions of the images corresponding to objects and portions corresponding to defects within ones of the objects.

4. The system of claim 2 wherein the image processor separates portions of the images corresponding to objects and portions corresponding to defects within ones of the objects.

5. The system of claim 1 wherein the image processor locates within the corrected image defect segments based on differences in gradation caused by differences in light reflectance of the defect segments.

6. The system of claim 5, wherein the image processor includes means for assigning a grade to the objects based on characteristics of the defect segments.

7. The system of claim 6, wherein the image processor further includes means for generating the defect selection signals based on the grade assigned to the objects.

8. A defective object removal system, comprising:

a conveyor that transports a plurality of objects;

an imaging unit disposed adjacent to the conveyor to capture images of the transported objects;

an image processor, coupled to receive the images from the imaging unit, that corrects the images to compensate for differences in light reflectance due to curvature of the objects, identifies defective objects from the corrected images, and generates ejector signals based on the identified defective objects; and an ejector unit that removes the defective objects from the conveyor in response to the ejector signals.

9. A method, performed by an image processor, for identifying and separating a defective object from a plurality of objects, comprising the steps of:

receiving images of the objects;

identifying a contour of the objects from the received images;

correcting the received images to compensate for differences in light reflectance due to the contour of the objects;

identifying the defective object from the corrected images; and generating signals to separate the defective object from the plurality of objects.

10. A system for identifying and separating a defective object from a plurality of objects, comprising:

means for acquiring an image for each of the objects, the acquired image including an object image and a background image;

means for separating the object image from the background image in the acquired image;

means for creating a contour image from the object image;

means for converting the contour image to a binary image;

means for forming an inverse image of the binary image;

means for identifying the defective object by adding the inverse image to the contour image; and means for separating the defective object from other ones of the objects.

11. The system of claim 10, wherein the means for creating a contour image includes means for forming a series of rings of the object image, each of the rings relating to a different intensity level of the object due to varying reflectance levels of the object.

12. The system of claim 11, wherein the means for forming an inverse image includes means for setting the intensity levels for each of the rings to a different uniform level to eliminate any defect from the binary image, and means for inverting the intensity level for each of the rings of the binary image.

13. A method for identifying and separating a defective object from a plurality of objects, comprising the steps of:

acquiring an image for each of the objects, the acquired image including an object image and a background image;

separating the object image from the background image in the acquired image;

creating a contour image from the object image;

converting the contour image to a binary image;

forming an inverse image of the binary image;

identifying the defective object by adding the inverse image to the contour image; and separating the defective object from other ones of the objects.

14. The method of claim 13, wherein the creating a contour image step includes the substep of forming a series of rings of the object image, each of the rings relating to a different intensity level of the object due to varying reflectance levels of the object.

15. The method of claim 14, wherein the forming an inverse image step includes the setting the intensity levels for each of the rings to a different uniform level to eliminate any defect from the binary image, and inverting the intensity level for each of the rings of the binary image.

* * * * *

UNITED STATES PATENT AND TRADEMARK OFFICE

CERTIFICATE OF CORRECTION

PATENT NO.: 5,960,098

DATED: September 28, 1999

INVENTOR: Yang TAO

It is certified that error appears in the above-identified patent and that said Letters Patent is hereby corrected as shown below:

Claim 15, col. 16, line 41 after "includes the", insert --substeps of--.

Title Page, item [54], delete the title and substitute --SYSTEMS AND METHODS FOR IDENTIFYING AND REMOVING DEFECTIVE OBJECTS--.

Signed and Sealed this

Eighteenth Day of April, 2000

*Attest:*

Q. TODD DICKINSON

*Attesting Officer*

*Director of Patents and Trademarks*